US009931583B2

(12) United States Patent
Saifutdinov et al.

(10) Patent No.: US 9,931,583 B2
(45) Date of Patent: Apr. 3, 2018

(54) RECTIFICATION TOWER WITH INTERNAL HEAT AND MASS EXCHANGE AND METHOD FOR SEPARATION OF MULTI-COMPONENT MIXTURES INTO FRACTIONS USING A RECTIFICATION TOWER WITH AN INTERNAL HEAT AND MASS EXCHANGE

(76) Inventors: Albert Faritovich Saifutdinov, Novosibirsk (RU); Oleg Yegorovich Beketov, Novosibirsk (RU); Viktor Seliverstovich Ladoshkin, Novosibirsk (RU); Guennadi Anatolievich Nesterov, Brooklyn, NY (US)

( * ) Notice: Subject to any disclaimer, the term of this patent is extended or adjusted under 35 U.S.C. 154(b) by 588 days.

(21) Appl. No.: 14/400,120

(22) PCT Filed: Jul. 12, 2012

(86) PCT No.: PCT/IB2012/001372
§ 371 (c)(1),
(2), (4) Date: Nov. 10, 2014

(87) PCT Pub. No.: WO2014/009762
PCT Pub. Date: Jan. 16, 2014

(65) Prior Publication Data
US 2015/0090581 A1    Apr. 2, 2015

(51) Int. Cl.
*B01D 3/28*    (2006.01)
*B01D 3/04*    (2006.01)
(Continued)

(52) U.S. Cl.
CPC .............. *B01D 3/28* (2013.01); *B01D 1/0064* (2013.01); *B01D 1/065* (2013.01); *B01D 3/008* (2013.01); *B01D 3/04* (2013.01)

(58) Field of Classification Search
CPC ...... B01D 1/0064; B01D 1/065; B01D 3/008; B01D 3/04; B01D 3/28
See application file for complete search history.

(56) References Cited

U.S. PATENT DOCUMENTS

| | | | | | |
|---|---|---|---|---|---|
| 344,856 | A | * | 7/1886 | Lillie | B23K 1/0056 228/11 |
| 3,741,879 | A | * | 6/1973 | Best, Jr. | B01D 1/065 159/13.3 |
| 2005/0224333 | A1 | * | 10/2005 | Saifutdinov | B01D 1/065 202/152 |

* cited by examiner

*Primary Examiner* — Brian McCaig
(74) *Attorney, Agent, or Firm* — Fay Sharpe LLP

(57) ABSTRACT

A rectification column for multi-component mixture separation with internal heat and mass exchange, which ensures a heat and mass exchange in the film mode with internal reflux generation along the whole length of heat and mass exchange tubes and which allows for an increased efficiency, is proposed. The rectification column includes the rectifying/enriching section with the heat and mass exchange in its tubular and annular spaces being topped by a heat carrier distributor with a distributor chamber (17) on top of the heat carrier distributor in such a way that a higher pressure of fluid heat carrier in the distributor chamber (17) than in the annular space is allowed. The design of the distributor allows to separate an upper outlet for heat carrier vapors and a lower outlet for liquid heat carrier from the annular space completely from the fluid supply of fluid heat carrier in the distributor chamber. A feed-in device allows the multi-component mixture to enter the tubular spaces from below. A device for liquid phase (from the multi-component mixture) discharge from the rectification column. A heating medium vessel may be connected to the annular space and steam condenser of the heat carrier medium. One or more additional lower rectification section/s (19) with the heat and mass exchange in its tubular space of the tubes being aligned (Continued)

with the tubes may be provided directly below the enriching section. A steaming section, wherein the tubes and may be equipped with turbulators. The rectification column permits to extract intermediate fractions of the separated mixture with the help of appropriate devices installed below the enriching section.

9 Claims, 9 Drawing Sheets

(51) Int. Cl.
    *B01D 1/06* (2006.01)
    *B01D 3/00* (2006.01)
    *B01D 1/00* (2006.01)

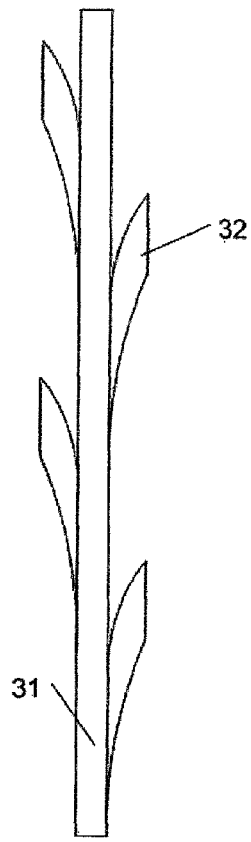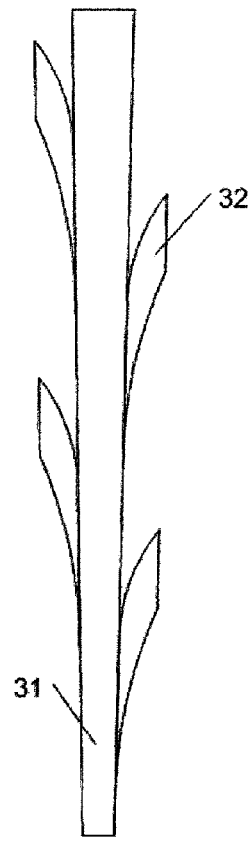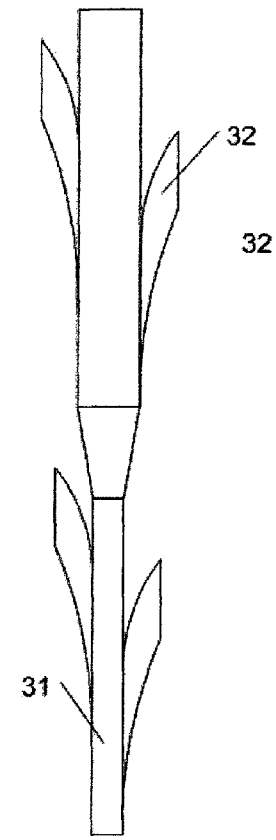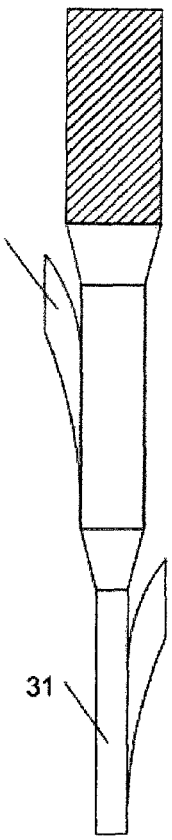
fig.9  fig.10  fig.11  fig.12
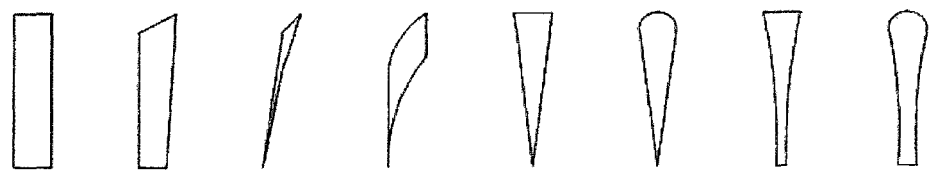
fig.13

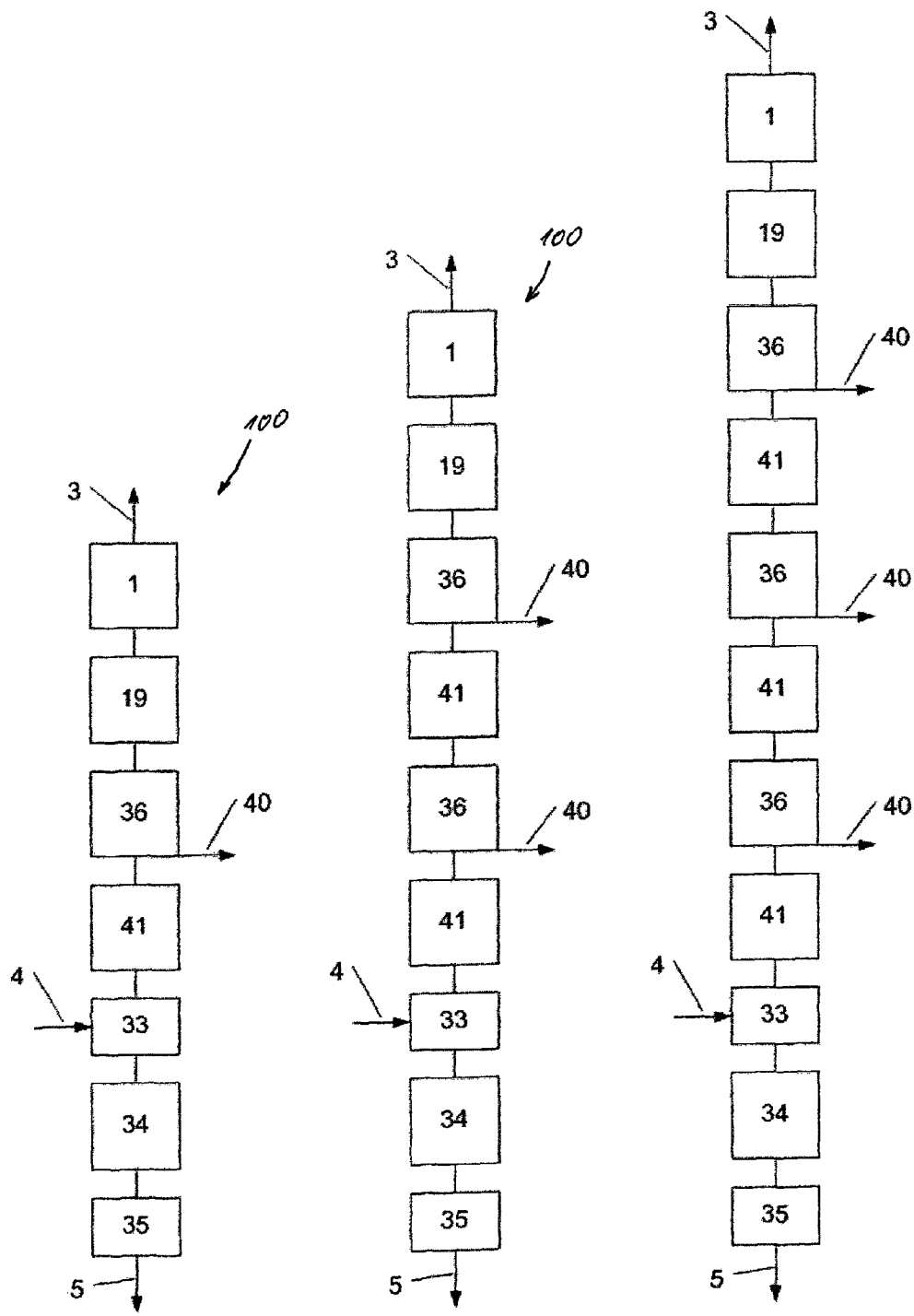

RECTIFICATION TOWER WITH INTERNAL HEAT AND MASS EXCHANGE AND METHOD FOR SEPARATION OF MULTI-COMPONENT MIXTURES INTO FRACTIONS USING A RECTIFICATION TOWER WITH AN INTERNAL HEAT AND MASS EXCHANGE

FIELD OF THE INVENTION

The invention is related to a rectification tower for separation of multi-component mixtures, namely to separation processes for liquid mixtures with different boiling temperatures, in particular for separation of lower-boiling and higher-boiling fractions and can be used in chemical industry, petrochemical industry, oil refining industry, food processing industry and in some other industries and comprises an internal heat and mass exchange for the separation of multi-component mixtures into fractions, comprising an enriching section made in the form of a vertical tubular heat exchanger (HE) that comprises heat and mass exchange tubes, in which vapors of the multi-component mixture which is to be rectified is supplied to the tubular spaces of the tubes and from which a rectified vapors portion is removed from the tubular spaces; the enriching section further comprises a body and tube plates, the tube plates being connected to the body, thus providing the tubular spaces and an annular space an upper heat carrier inlet into the annular space, an upper heat carrier vapor outlet from an annular space being located below an upper inlet, a lower heat carrier outlet, a heat carrier distributor that distributes fluid from an upper heat carrier fluid inlet into the annular space and provides for fluid flowing along external surfaces of the tubes, the heat and mass exchange tubes extend through orifices in the heat carrier distributor, the orifices leave clearances between the heat carrier distributor and the external surfaces of the tubes, heat and mass exchange surfaces in the annular space are made by the external surfaces of the tubes between the lower tube plate up to the heat carrier distributor; the heat and mass exchange surfaces in the tubular space are made by the internal surfaces of the tubes between the lower tube plate up to the heat carrier distributor; the rectification tower further comprises a feed supply to and a vapor extraction as well as a device for discharging of liquid fraction from the tubular spaces. As such, the rectification tower with an internal heat and mass exchange for the separation of multi-component mixtures into fractions, comprises an enriching section made in the form of a vertical tubular heat exchanger that comprises heat and mass exchange tubes inside of which vapors of the multi-component mixture which is to be rectified is supplied to the tubular spaces of said tubes and from which a rectified vapors portion is removed. Said enriching section further comprises a body, tube plates, said tube plates being connected to said body thus providing said tubular spaces and said annular space. An upper heat carrier inlet, and a lower fluid heat carrier outlet are connected to said annular space. Said upper heat carrier vapors outlet from the annular space is located below said upper heat carrier inlet. A heat carrier distributor that distributes fluid from the upper heat carrier fluid inlet into the annular space provides for fluid flowing along the external surfaces of the tubes. Said the heat and mass exchange tubes extend through orifices in said heat carrier distributor. Said orifices leave clearances between said heat carrier distributor and external surfaces of tubes. The heat and mass exchange surfaces in the annular space are made by the external surfaces of the tubes between said lower tube plate up to said heat carrier distributor. The heat and mass exchange surfaces in the tubular space are made by the internal surfaces of the tubes between said lower tube plate up to said heat carrier distributor. The rectification tower further comprises a supply for the vapors of the material mixture which is to be rectified to the tubular space as well as a vapors extraction device for a vapors fraction of the material mixture and a device for discharging of liquid fraction of the material mixture from the tubular spaces. The invention is further related to a method for separation of multi-component mixtures into fractions using a rectification tower with an internal heat and mass exchange and comprises a rectification tower with an internal heat and mass exchange, comprising the steps of providing an enriching section made in the form of a vertical tubular heat exchanger (HE) that comprises heat and mass exchange tubes, the enriching section further comprising a body and tube plates, the tube plates being connected to the body, thus providing the tubular spaces and an annular space, an upper heat carrier inlet into the annular space, an upper heat carrier steam outlet from the annular space being located below said upper inlet, a lower heat carrier outlet, a heat carrier distributor that distributes fluid from an upper heat carrier fluid inlet into the annular space and provides for fluid flowing along external surfaces of the tubes, the heat and mass exchange tubes extending through orifices in the heat carrier distributor, the orifices leaving clearances between the heat carrier distributor and external surfaces of the tubes, heat and mass exchange surfaces in the annular space are made by the external surfaces of the tubes between the lower tube plate up to the heat carrier distributor, heat and mass exchange surfaces in the tubular space are made by the internal surfaces of the tubes between the lower tube plate up to the heat carrier distributor, the rectification tower further comprises a feed supply to and a vapor extraction as well as a device for discharging of liquid fraction from the tubular spaces, supplying a steam of the multi-component mixture which is to be rectified to the tubular spaces of the tubes and removing from the tubular spaces a rectified vapor portion.

TECHNOLOGICAL BACKGROUND

The rectification column with the internal heat exchange is known (Japanese patent—JP 2001046803 A). According to this technical solution shown in Fig. A, internal 4' and external 5' spaces of one or plenty of tubes 25' are separated from each other by upper 3a' and lower 3b' tube plates inside a cylindrical body 1' of a rectification tower. The temperature difference inside and outside tubes 25' is established by the differing pressure in these spaces 4' and 5'. High pressure is maintained inside of tubes 25' while a low pressure is maintained outside of tubes 25'. During a heat transfer from a high pressure side to a low pressure side through walls of tubes 25', the one or many tubes are used as inner and outer heat exchange surfaces. The high pressure side functions as a concentration or rectifying section and the low pressure side functions as a heat extraction surface (a steaming section). Stripping vapor enters the out-side 5' at the bottom at 10' and leaves the out-side 5' at the top at 7'. Stripping liquid enters the out-side 5' at the top at 6' and leaves the out-side 5' at the bottom at 11'. Vapor of multi-component mixture enters the in-side 4' of tubes 25' below the bottom at 12' and leaves (as an enriched fraction) the in-side 4' at the top at 9'. Liquid of multi-component mixture enters the in-side 4' at the top at 8' and leaves the in-side 4' at the bottom at 13'. Thus both, stripping material and multi-component mixture each are cycled as a vapor and as a liquid in counter current through the column 1'. Liquid reflux is generated by a condensation of vapor arising in a regular wire-wrapped screen filter 21' in upper part of the internal 4' tubular surface of the rectification tower with internal heat exchange. Thus, an external condenser is avoided. The space inside tubes 25' is used as a rectifying part of the rectification tower (vapors are enriched by lower-boiling mixture components). The space outside tubes 25' is used as a steaming section (the liquid is enriched by higher-boiling mixture components). The spaces (4) and (5) inside and outside of the tubes (25) are filled with regular packing.

The disadvantage of this rectifying column is low efficiency of heat-and-mass transfer. It is explained by the fact that heat exchange surfaces (walls of tubes) are used only for heat transfer while the masses transfer takes places in a regular packing. The supply of fluid in inter-tubular space doesn't supply efficient interaction of fluid with heat exchange surfaces.

The above mentioned disadvantage is partially eliminated in the compact rectification tower for mixed fluid separation that contains the rectification tower (WO 03/078014 A). The tower shown in Fig. B consists of the tower body 1" with tube-grate 3", 4" between which heat and mass exchange tubes 2" are fixed. The tower has a device for vapor phase remove at the top of the tower and a device for liquid phase remove at the bottom of the tower. At the bottom of the rectification tower there is a connection point (an inlet and outlet pipe 7") for heat carrier supply and a connecting pipe (an inlet pipe 5") for condensate return of a heat carrier. Internal spaces between heat-and-mass exchange tubes 2" communicate each other by a fluid medium. On the top of the tower there is a connection pipe (an inlet and outlet pipe 5") for heat carrier vapor phase remove and condensate return of heat carrier.

The pressure regulator is installed for supply of heat carrier return into the condenser. The heat exchange takes place in this tower when vapors interacts with liquid film flowing down on the internal and external surfaces of heat and mass exchange tubes. In the upper part of the tower between the tubes there is a distribution plate 8" under the inlet pipe 5" which provides a gravity flow of heat carrier along external surfaces of heat-and-mass exchange tubes 2" in the form of film.

An irregular flow of fluid on the distribution plate 8" may be a disadvantage of the rectification tower and as a consequence there is a some difference in reflux of external surfaces of the tubes 2". It may result in irregular heat-and-mass exchange in a cross-section of the tower.

The closest prior art of the invention is a rectification tower with an internal heat-and-mass exchange Japanese patent 2004216338 A, shown in Fig. C). The rectification tower includes a rectifying section made in the form of a vertical tube heat exchanger with vapor supplied in the tubular space and vapor removed from the tubular space that consists of a body 1''', tubes 25''' connected to this body 1''' and tube plates 3a''', 3b''', thereby defining tubular 4''' and annular 5''' spaces in the body 1''' for separation of multi-component mixtures into fractions, the upper vapors outlet 7''' from the annular space 5''' is located below the upper fluid inlet 6''' in the annular space 5'''. Above the upper vapors outlet 7''' there is a fluid distributor 30''' that distributes fluid from the upper fluid inlet 6''' into the annular space 5''' and provides for fluid flowing along external sides of tubes 25'''. The distributor has shallow rims around all tubes 25''' as well as along outer perimeter of the distributor, which provide for clearances with respect to all tubes 25''' and to the inner surface of body 1''' which rims in order to distribute the liquid evenly to all pipes and to the inner surface of body 1'''. A packing 4a''' may be fixed in the tubular space. The fluid flows along external sides of tubes until it comes to a packed bed 5a''' being mandatory for the shell side 5''' of the pipes 25'''. The fluid is supplied from the external side of tubes to the packing. The tubular space performs the function of the rectifying section while the annular space performs the function of the steaming section. The fluid distributor must have an exact horizontal alignment in order to distribute the liquid evenly to all pipes.

The disadvantage of this prototype is a low efficiency of heat transfer. It is preconditioned by at least two reasons. In this prototype column, the tubular and annular spaces are filled in with the packing. The fluid flows along the external sides of tubes only up to the packed bed then the fluid is carried off from the external sides of tubes to the packing and thereby the heat and mass exchange in the column is made worse. When the fluid is supplied from the distributor into the one point on the upper surface of each tube, the fluid is not distributed evenly on the total perimeter of the external surface of tubes. Despite the exact horizontal position of the distributor and availability of spirals on tubes, the large portion of fluid flows down in stream along the external surfaces of tubes and doesn't provide for even reflux of all external surfaces of tubes that also worsens the heat and mass exchange.

SUMMARY OF THE INVENTION

The purpose of the invention is to increase the efficiency of the heat-and-mass exchange. This problem is solved by a rectification tower in accordance with the present invention. According to a preferred embodiment of this invention a rectification tower with internal heat and mass exchange that includes an enriching section is made in the form of a vertical tubular heat exchanger with vapor supply into tubular spaces and vapor removal from tubular spaces, a body, tubes connected to this body and tube plates which space the inside and outside of the tubes with the purpose to divide multi-component mixtures into fractions, the upper vapors outlet from annular spaces is located below the upper fluid inlet into annular spaces. A fluid distributor is placed above the upper vapor outlet. The fluid distributor distributes fluids from the upper fluid inlet to annular spaces and provides for fluids flowing along external sides of tubes. The rectification tower also has a heat carrier tank connected to the upper fluid inlet into the annular space of the rectifying section A steaming section comprises a steam-in device and a device for discharge of liquid fraction from the rectification tower. The tubes contain filling elements. The fluid distributor is air- or vapor-tightly connected to the body and defines a distribution chamber that includes the space outside the tubes confined by the upper tube plate and the fluid distributor. Heat and mass exchange tubes extend through orifices in the fluid distributor. Fluid outlets from the distribution chamber are formed by gaps or clearance between the distributor orifices and the external surfaces of the tubes. Moreover, heat and mass exchange surfaces on the outside tubes are formed by external surfaces of the tubes as well as from the lower tube plate up to the fluid distributor. The fluid pressure in the distribution chamber above the fluid distributor may be higher than the pressure on the outside of the tubes below of the fluid distributor. The heat carrier tank is additionally connected to the lower outlet of the heat carrier from the annular space of the enriching section and to a vapors condenser of the heat carrier that is also connected to the annular space of the enriching section. The rectification tower may contain, at least, one additional rectification section with heat and mass exchange inside of tubes. This rectification section is located between the enriching section and a steam-in device and contains a body with tube plates and tubes that form tubular and annular spaces in the body. The tube plate end of the lower rectification section conjugates to the lower tube plate end of the rectifying section in such a way that tubes of the additional lower rectification section and enriching section are placed in coaxial relation. Filling elements of all tubes are made in the form of turbulators that contain deflecting elements for vapors rotation. Gaps between distributor orifices and external surfaces of tubes are realized in the form of radial coaxial gaps around tubes. Sizes of gaps are determined by the fluid pressure in the distributor and equal to 0.05-1.0 mm, for example. Gaps between distributor orifices and external surfaces of tubes are formed by the vertical channels along the perimeter of distributor orifices in number of, at least, two per each orifice. The pressure difference in the chamber above the distributor and in the annular space under the distributor is made with the help of a pump. The pump is located below the level of the heat carrier tank. The heat carrier tank and the vapors condenser of the heat carrier can form a common space. The vapors condenser of the heat carrier is supplied with a pressure control valve installed at the outlet from the vapors condenser of the heat carrier whereby the vapors condenser of the heat carrier is connected to devices for increasing or decreasing pressure in the annular space. The vapors condenser of the heat carrier can also communicate with tubular spaces and one of fractions can be extracted from the heat carrier tank. Any condensable and evaporable fluid heat carrier with suitable boiling temperature know now or in future for rectification purposes may used according to this invention. This includes fluid heat carriers which are different from the material mixture which is to rectified but also fluid heat carriers which are part of the material mixture which is to rectified, like a distillate of one of the lower-boiling fractions.

According to another preferred embodiment, the lower tube ends of the enriching section of the rectification tower may project beyond the end of the lower tube plate of the enriching section and upper tube ends of the additional lower rectification section are sunken in the upper tube plate of the additional lower rectification section. The upper part of orifices in the upper tube plate of the additional lower rectification section has a bigger diameter than a diameter of tubes for deepening to insert lower tube ends of the enriching section.

Tubes of the additional lower rectification section may be connected to tubes of the enriching section of the rectification tower with the help of threaded or other connections.

Turbulators may be made in the form of rods, for example, or tubes with hooked ends or are made in the form of tapered rods, for example, or tubes with a cross-section expanding in the upper direction and hooked ends or made in the form of step-up rods, for example, or tubes with a cross-section expanding in the upper direction and hooked ends. The upper part of step-up rods or tubes with a cross-section expanding in the upper direction and hooked ends may have spiral slots or is made with wrapped spirals. There may be threaded or spiral slots along the whole length of external and/or internal surfaces of tubes. Winding-up may be made along the whole length of external and/or internal surfaces of tubes.

External and/or internal surfaces may be covered with porous coating along the whole length of the tubes. External and/or internal surfaces may be covered with oxide coating along the whole length of tubes.

According to the invention, the fluid distributor ensures simultaneous and even distribution of heat carrier along external surfaces of tubes in the form of a film that increases the heat and mass exchange efficiency.

According to the invention the heat carrier tank may be connected via an upper fluid inlet of the body to the annular space of the enriching section. Additionally, the heat carrier tank may be connected via a lower heat carrier outlet of the body from the annular space of the enriching section. The heat carrier tank may further be connected to a vapors condenser of the heat carrier which also communicates with the annular space of the enriching section. Vapor in the condenser condenses at a boiling point of fluid.

The boiling fluid or pre-boiling fluid is supplied under excess pressure into the distribution chamber. When fluids go out through gaps in the annular spaces, the drop in pressure makes conditions for instantaneous boiling of fluids on the external surfaces of tubes. It improves conditions for the heat extraction from external surfaces of tubes and increases the heat and mass exchange efficiency in the column.

In the additional lower rectification section the heat and masses are exchanged only in the tubular spaces. Therefore all heat from condensing vapors of the separated mixture is completely consumed for re-evaporation of lower-boiling fractions from the wet reflux which also increases the heat and mass exchange efficiency.

Filling elements of tubes are made in the form of turbulators that spin vapors and improve the efficiency of the vapors interaction with internal walls of tubes which increases the heat and mass exchange efficiency on the whole.

In summary, the invention is directed to a rectification tower with an internal heat and mass exchange for the separation of multi-component mixtures into fractions. The rectification tower includes an enriching section made in the form of a vertical tubular heat exchanger (HE) that comprises heat and mass exchange tubes in which vapors of the multi-component mixture which is to be rectified are supplied to the tubular spaces of the tubes and from which a rectified vapors portion is removed from the tubular spaces. The enriching section further comprises 1) a body and tube plates, wherein the tube plates are connected to the body, thus providing the tubular spaces and the annular space, 2) an upper heat carrier inlet into the annular space, 3) an upper heat carrier vapor outlet from the annular space is located below said upper inlet, 4) a lower heat carrier outlet, and 5) a heat carrier distributor that distributes fluid from an upper heat carrier fluid inlet into the annular space and provides for fluid flowing along external surfaces of the tubes. The heat and mass exchange tubes extend through orifices in the heat carrier distributor. The orifices leave clearances between the heat carrier distributor and external surfaces of the tubes. The heat and mass exchange surfaces in the annular space are made by the external surfaces of the tubes between the lower tube plate up to the heat carrier distributor. The heat and mass exchange surfaces in the tubular space are made by the internal surfaces of the tubes between the lower tube plate up to the heat carrier distributor. The rectification tower further comprises a feed supply to, and a vapor extraction as well as a device for discharging of liquid fraction from, the tubular spaces. The heat carrier fluid distributor is vapor tightly connected to the body and defines a distribution chamber that includes an annular space confined (in vertical direction) by the upper tube plate and the heat carrier fluid distributor. The fluid outlets of the distribution chamber are made by said clearances between the distributor orifices and the external surfaces of tubes. A pressurizing device, like a pump, is provided for holding the fluid pressure in the distribution chamber above the fluid distributor higher than the pressure in the annular space below of the fluid distributor. The rectification tower may include a heat carrier tank connected to the upper heat carrier inlet into the annular space of the enriching section, further connected to the lower heat carrier outlet from the annular space of the enriching section and/or to a vapor condenser of the heat carrier which also communicates with the annular space of the enriching section. The rectification tower may include at least one additional lower rectification section with the heat and mass exchange in tubular spaces located between the enriching section and the feed-in device. The at least one additional lower rectification section has a body with tube plates and tubes that make tubular and annular spaces in the body. The rectification tower may have the upper tube plate of the additional lower rectification section conjugate to the lower tube plate of the rectifying or enriching section in such a way that the tubes of the additional lower rectification section and enriching section are placed in coaxial relation. The rectification tower may have filling elements of all tubes which are provided and be preferably made in the form of turbulators that contain deflecting elements for steam rotation. The rectification tower may have a stripping section being positioned between the feed supply for the multi-component mixture and the liquid extraction for the liquid fraction/residue of the multi-component mixture. The rectification tower may have a gap(s) between the distributor orifices and the external surfaces of tubes that are realized in the form of radial coaxial gaps around tubes, and the sizes of gaps are determined by the fluid pressure in the distributor and may equal to 0.05-1.0 mm, for example. The rectification tower may have the gaps between distributor orifices and external surfaces of the tubes formed by vertical channels along the perimeter of distributor orifices in the number of (at least) two per each orifice. The rectification tower may have pressure difference in the chamber above the distributor and in the annular space under the distributor made with the help of a pump. The rectification tower may have a pump located below the level of a heat carrier tank. The rectification tower may have the heat carrier vessel and steam condenser of the heat carrier that can form a common space. The rectification tower may have the steam condenser of the heat carrier supplied with a pressure regulating valve installed at the outlet from the vapor condenser of the heat carrier whereby the vapor condenser of the heat carrier is connected to at least one device for increasing or decreasing pressure in the annular space. The rectification tower may include a vapor condenser of the heat carrier that can also communicate with the tubular spaces and one of the fractions can be extracted from a heat carrier tank. The rectification tower may have the lower tube ends of the enriching section of the rectification tower project beyond the end of the lower tube plate of the enriching section and upper tube ends of an additional lower rectification section are sunken in the upper tube plate of the additional lower rectification section, and the upper part of orifices in the upper tube plate of the additional lower rectification section may have a bigger diameter than a diameter of the tubes for deepening to insert lower tube ends of the enriching section. The rectification tower may have tubes of an additional lower rectification section being connected to tubes of the enriching section of the rectification tower with the help of threaded or other connections. The rectification tower may have turbulators made in the form of bars (for example) or tubes with hooked arms or ends. The rectification tower may have turbulators made in the form of tapered rods (for example) or tubes with a cross-section expanding in the upper direction and hooked arms or ends. The rectification tower may have turbulators made in the form of step-up rods (for example) or tubes with a cross-section expanding in the upper direction and hooked arms or ends. The rectification tower may have the upper part of step-up rods or tubes with a cross-section expanding in the upper direction and hooked arms or ends having spiral slots or is made with wrapped spirals. The rectification tower may have threaded or spiral slots along the whole length of external and/or internal surfaces of the tubes. The rectification tower may have a winding-up that is made along the whole length of external and/or internal surfaces of the tubes. The rectification tower may have external and/or internal surfaces that are covered with porous coating along the whole length of the tubes. The rectification tower may have external and/or internal surfaces of tubes that are covered with oxide coating along the whole length of the tubes. The invention is also directed to a method for the separation of multi-component mixtures into fractions using a rectification tower with an internal heat and mass exchange. The method includes the steps of A) providing an enriching section made in the form of a vertical tubular heat exchanger (HE) that comprises heat and mass exchange tubes, wherein the enriching section further comprises a body and tube plates, and wherein the tube plates are connected to the body, thus providing the tubular spaces and an annular space, an upper heat carrier inlet into said annular space, an upper heat carrier steam outlet from the annular space being located below the upper inlet, a lower heat carrier outlet, a heat carrier distributor that distributes fluid from upper heat carrier fluid inlet into the annular space and provides for fluid flowing along external surfaces of tubes, and wherein the heat and mass exchange tubes extend through orifices in the heat carrier distributor, and wherein the orifices leave clearances between the heat carrier distributor and external surfaces of tubes, heat and mass exchange surfaces in the annular space are made by the external surfaces of the tubes between the lower tube plate up to the heat carrier distributor, heat and mass exchange surfaces in the tubular space are made by the internal surfaces of the tubes between the lower tube plate up to the heat carrier distributor, and wherein the rectification tower further comprises a feed supply to and a vapors extraction as well as a device for discharging of liquid fraction from the the tubular spaces, B) supplying a steam of the multi-component mixture which is to be rectified to the tubular spaces of the tubes and removing from the tubular spaces a rectified vapor portion, C) vapor tightly connecting the heat carrier fluid distributor to the body thus defining a distribution chamber that includes an annular space confined (in vertical direction) by the upper tube plate and the heat carrier fluid distributor, D) providing fluid outlets to the distribution chamber in the form of the clearances between the distributor orifices and the external surfaces of tubes, E) pressurizing the heat carrier fluid within the distribution chamber, and F) holding the fluid pressure in the distribution chamber above the fluid distributor higher than the pressure in the annular space below of the fluid distributor. The method may include the fluid being supplied under excess pressure into the distribution chamber under boiling or pre-boiling conditions. The method may include a drop in pressure conditions for instantaneous boiling of fluids on the external surfaces of tubes when fluids go out through gaps in the annular spaces. The method may include an additional lower rectification section that the heat and masses are exchanged only in the tubular spaces; thus, particularly, all heat from condensing steam of the separated mixture is completely consumed for re-evaporation of lower-boiling fractions from the wet reflux. The method may include reduction in the pressure in the condenser and an eventual heat carrier tank and/or in the annular space of the enriching section that communicate with the condenser, particularly by a device connected to the steam condenser of the heat carrier. The method can have more precise regulation of pressure in the annular space, additional gas intake into the annular space from the atmosphere or from an external source of gas, particularly by a pressure control valve. The method may include steam reduction in the tubular spaces that is compensated by a corresponding restriction in the cross-section of the tubular spaces, thus maintaining a stable high speed of the steam flow along the whole length of the tubes. The method may include a final stripping of a lower-boiling fraction residue from higher-boiling fractions that is carried out in a lower stripping section; particularly, the stripping is made with the help of a natural stripping of lower-boiling fractions and/or with the help of a forced supply of heat to the stripping section. The method may include the vapor amount and speed being reduced by a steam mixture (particularly distilled in the rectification tower) that contains a small amount of lower-boiling fractions; particularly, the cross section of the tubular space in the upper part of the tubes is restricted.

The above-mentioned components to be used according to the invention, as well as those claimed and described in the examples of embodiments, are not subject in size, shaping, material selection and technical conception to any special exceptional conditions, so that the selection criteria known in the field of application can be applied without restriction.

Additional details, characteristics and advantages of the invention result from the sub claims as well as from the description below of the associated drawing in which, for the sake of example, several embodiments according to the invention are illustrated. Shown in the drawings are:

BRIEF DESCRIPTION OF THE DRAWINGS

In the drawings are shown in:
FIG. 9 A turbulator in the form of a rod or a tube with hooked arms or ends;
FIG. 10 A turbulator in the form of a tapered rod or tube with hooked arms or ends;
FIG. 11 A turbulator in the form of steped rods or tubes with hooked arms or ends;
FIG. 12 A turbulator in the form of steped rods or tubes with hooked arms or ends and a spiral;
FIG. 13 Preferred shapes of some hooked arms or ends of a turbulator;
FIG. 16 A flow chart of a rectification tower with one side extraction;
FIG. 17 A flow chart of the rectification tower with two side extraction;
FIG. 18 A flow chart of the rectification tower with three side extraction.

DETAILED DESCRIPTION OF THE DRAWINGS

Figure 1:
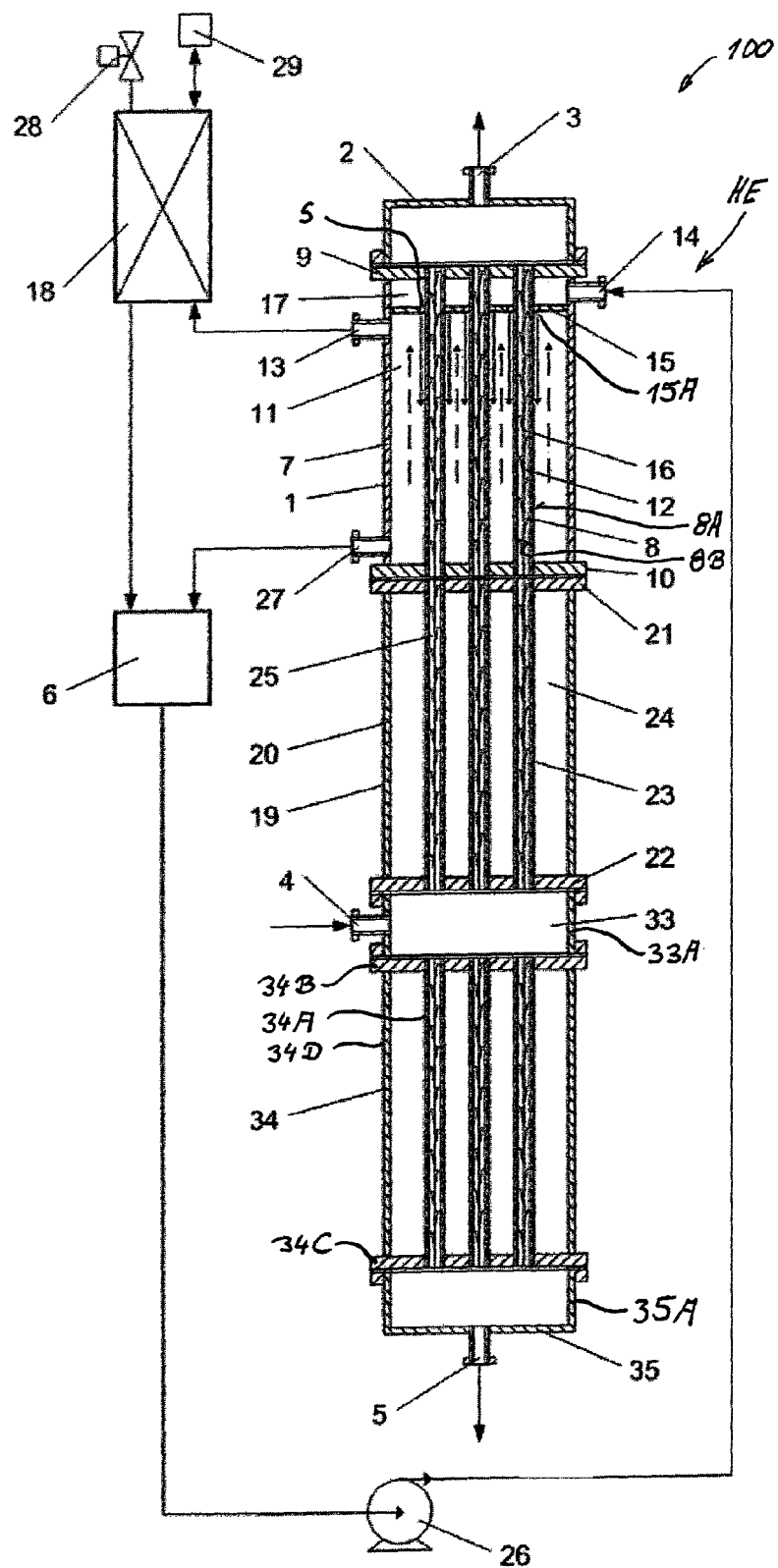
FIG. 1 A rectification tower with a split type condenser and a heat carrier tank.
Figure 4:
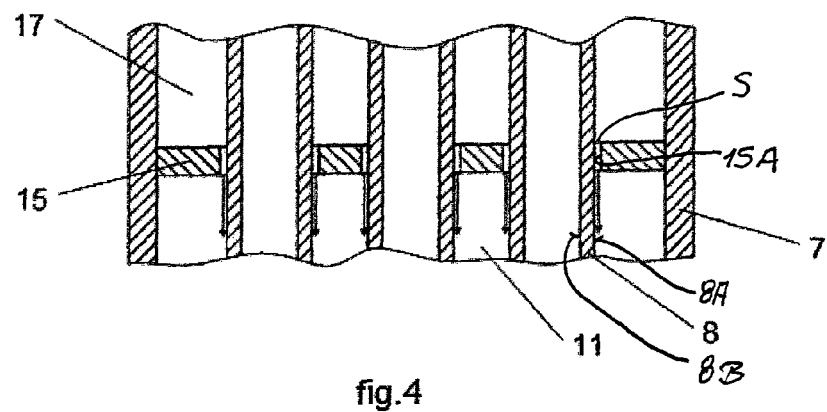
FIG. 4 A fluid distributor.

A rectification tower 100 with internal heat and mass exchange for dividing multi-component mixtures into fractions includes the enriching section 1 which is made in the form of a vertical tubular heat exchanger (FIG. 1, 2, 3). The enriching section 1 has a cover 2, a vapors extractor 3 from a tubular space or spaces 12 of the enriching section 1, a feed supply 4 into the tubular space or spaces 12, a fluid extraction 5 from the column, a heat carrier tank 6, a body 7 and tubes 8 with open ends at both sides. Vapors and fluid extractions 3 and 5 and supplies 4 and 14 can be done in any known manner, for example, in the form of pipes or connection points. Tubes 8 are connected to the body 7 of the enriching section 1 with the help of tube plates 9 and 10. The tubes 8 and tube plates 9 and 10 form an annular space 11 inside of the body 7. And tubular space or spaces 12 are defined by the inside space/spaces of tubes 8 in the body 7 with the purpose to divide multi-component mixtures into fractions. An upper heat carrier steam outlet 13 from the annular space 11 is located below the upper fluid inlet 14 to the annular space 11. Above the upper steam outlet 13 there is a fluid distributor 15 that distributes fluids from the upper fluid inlet 14 to the annular space 11 and provides for the fluid flowing along the external surfaces 8A of tubes 8. Tubes 8 contain filling elements 16. The fluid distributor 15 is air tightly connected to the body 7 and forms a distribution chamber 17 that confines the annular space 11 confined by the upper tube plate 9, the inner surface of body 7 and the fluid distributor 15. The heat and mass exchange tubes 8 extend through orifices in the fluid distributor 15. Fluid outlets are made by gap S between distribution orifices 15 and external surfaces 8A of tubes 8 (FIG. 4). Heat and mass exchange surfaces in the annular space 11 are formed by external surfaces 8A of tubes 8 from the lower tube plate 10 up to the fluid distributor 15. The fluid pressure in the distribution chamber 17 above the fluid distributor 15 is higher than the pressure in the annular space 11 below of the fluid distributor 15.

The heat carrier tank 6 may be connected to the upper fluid inlet 14 to the annular space 11 of the rectifying (enriching) section 1. The heat carrier tank 6 is additionally connected to the lower heat carrier outlet 27 from the annular space 11 as well as with the vapors condenser 18 of the heat carrier that also communicates via the upper vapors outlet with the annular space 11 of the enriching section 1 (FIG. 1).

Figure 2:
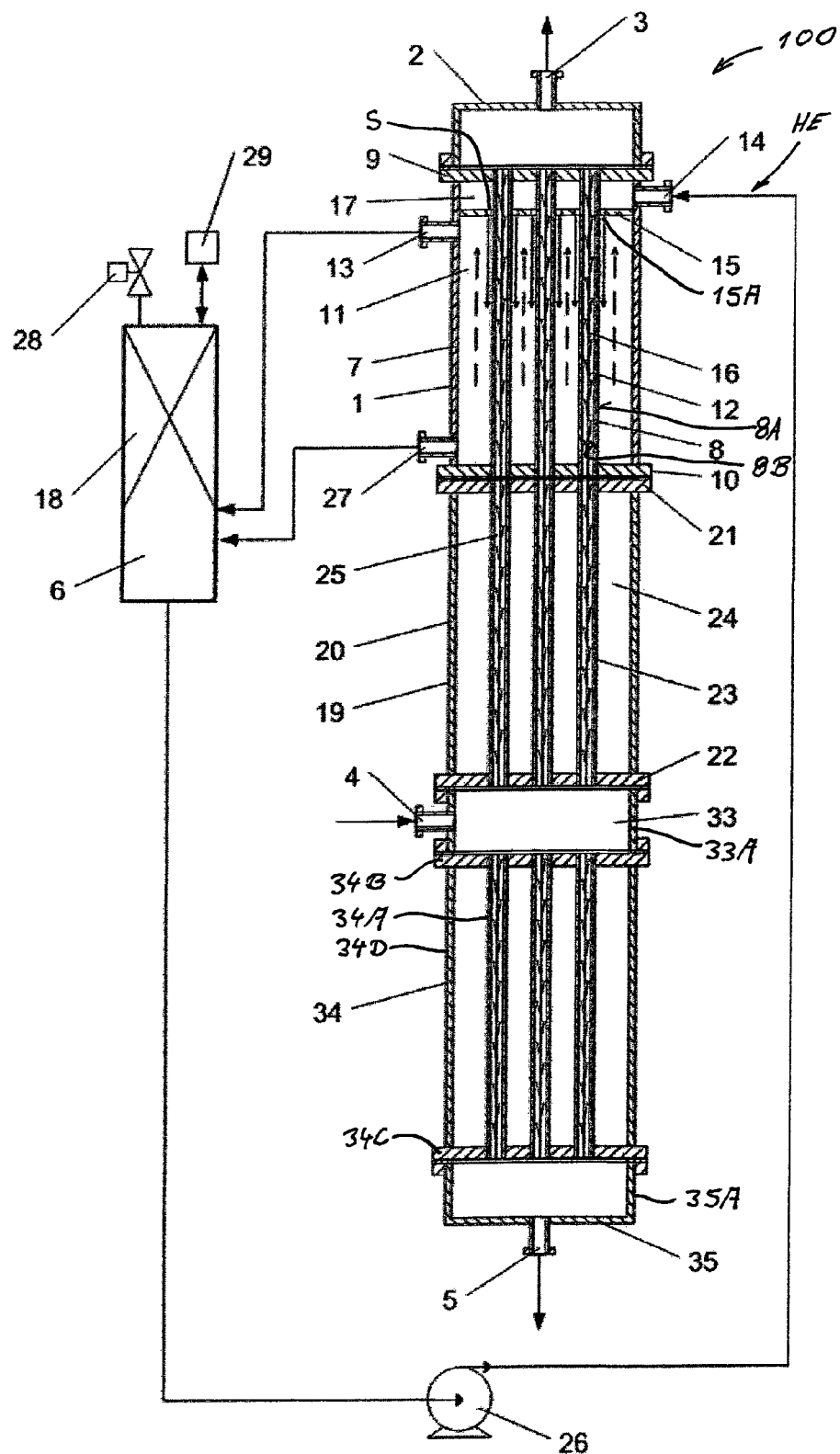
FIG. 2 The rectification tower of FIG. 1, however with a common space for condenser and heat carrier tank.

In a second option, the heat carrier tank 6 and the vapor condenser 18 of the heat carrier can form a common space (FIG. 2). In the options shown in FIG. 1 and FIG. 2 a pressure control valve 28 can be installed at an outlet from the vapor condenser 18 or the heat carrier. In this case the vapor condenser 18 or the heat carrier is connected to a device 29 used to increase or decrease the pressure in the annular space 11. The device 29 can be made in any known manner, for example, in the form of a vacuum pump (mechanical, injector, steam, ejector, etc.), in the form of a compressor, a vessel with compressed gas and so on.

Figure 3:
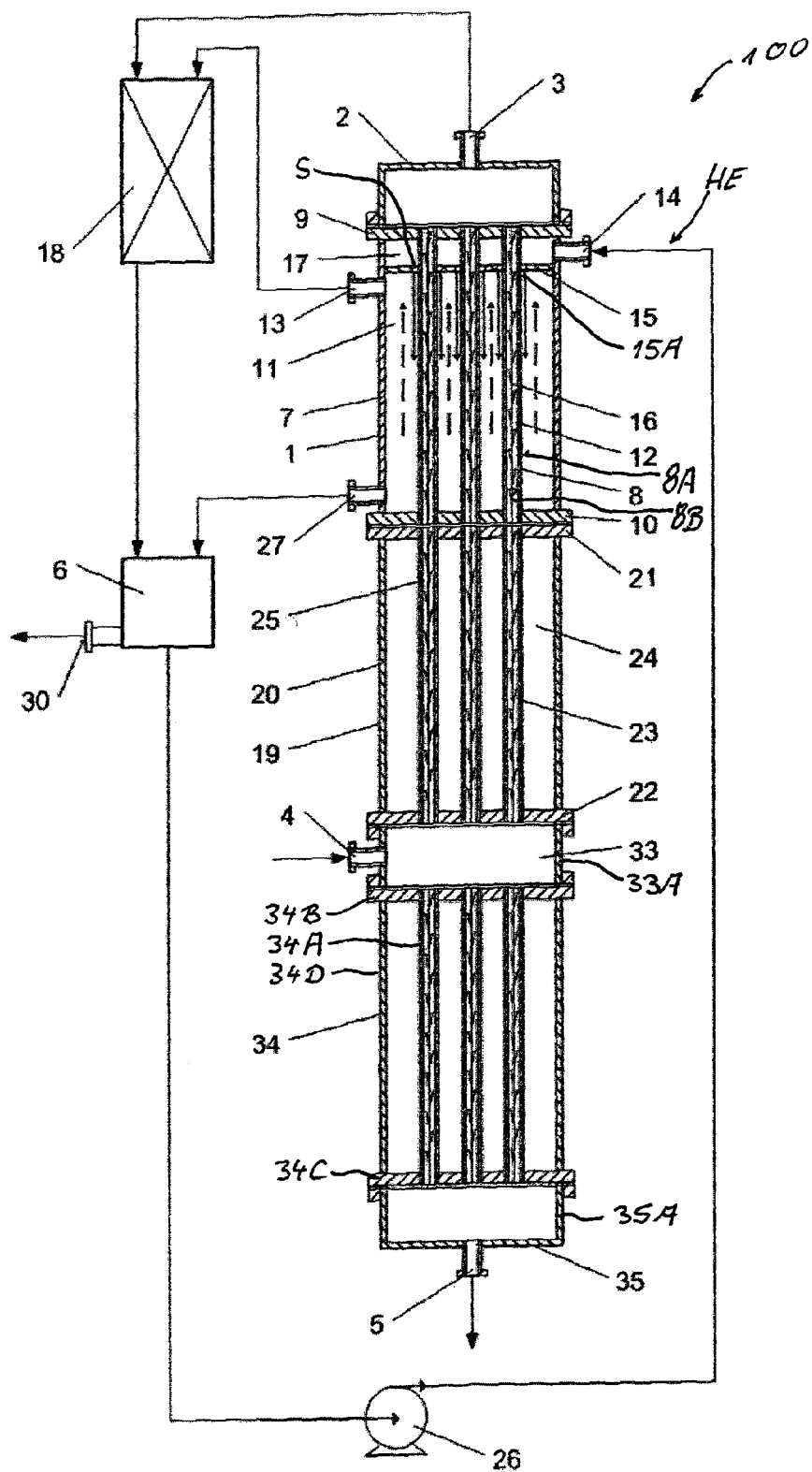
FIG. 3 The rectification tower of FIG. 1, however n which a vapors condenser communicates with annular and tubular spaces.

In a third option, the heat carrier tank 6 is connected to the vapor condenser 18 or the heat carrier, again, communicates with the annular space 11. In this case, however, the vapors condenser 18 or the heat carrier can also communicate with the tubular space 12 through the vapors extraction 3 with the help of tubes, for example, and the heat carrier tank 6 can release at least one fraction of the cut mixture through an outlet 30 (FIG. 3).

The rectification tower 100 may contain an additional lower rectification section 19 with heat and mass exchange in a tubular space 25 located between the rectifying section 1 and a (vapor/steam) feed-in device 33, which is explained later. The additional lower rectification section 19 has a body 20, upper and lower tube plates 21 and 22 and tubes 23 which form an annular space 24 at their out-side and at least one tubular space 25 in their inside in the body 20. The top of the tube plate 21 of the additional lower rectification section 19 is conjugated with the bottom end of the tube plate 10 of the enriching section 1 in such a way that tubes 23 of the additional lower rectification section 19 and tubes 8 of the enriching section 1 are placed in coaxial or a lining relation.

Figure 5:
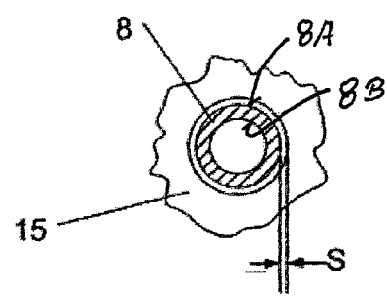
FIG. 5 Fragments of the fluid distributor of FIG. 4 with radial gaps.

In one of the options gaps "S" between orifices of the distributor 15 and external surfaces 8A of tubes 8 are made in the form of radial coaxial gaps around each of the tubes 8. In this case gaps sizes are determined by the fluid pressure in the distributor (or vice versa) and equal to 0.05-1.0 mm (FIG. 5).

Figure 6:
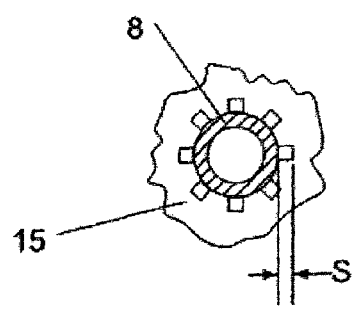
FIG. 6 Fragments of the fluid distributor of FIG. 4 with vertical channels.

In the other option gaps "S" between orifices of the distributor 15 and external surfaces of tubes 8 are formed by vertical channels distributed along the perimeter of orifices of the fluid distributor 15 in the number of not less than 2 per each orifice (FIG. 6). Gaps can be made in any other way. The pressure difference in the chamber 17 above the fluid distributor 15 as compared to the annular space 11 under the fluid distributor 15 is made with the help of any known device that ensures fluid transmission and creates an excessive pressure, for example, with the help of a pump 26. The pump 26 is located below the level of the heat carrier tank (FIG. 1, 2, 3).

Figure 7:
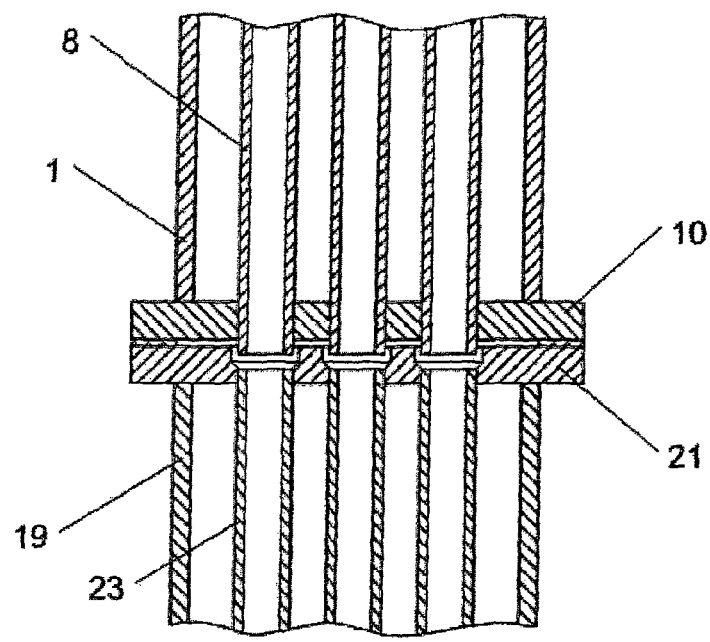
FIG. 7 A junction of an enriching section of the rectification tower of one of FIGS. 1 to 3 with an additional rectification section that has deepening in the tube plate.
Figure 8:
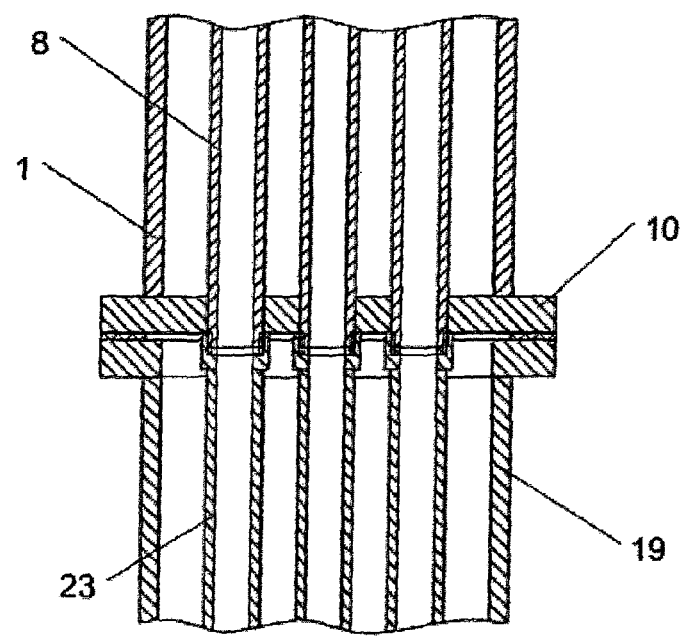
FIG. 8 A Connection of the enriching section tubes of the rectification tower of one of FIGS. 1 to 3 to tubes of an additional lower rectification section with the help of threaded connections.

In one of the options, the lower ends of tubes 8 of the enriching section 1 go beyond the edge of the lower tube plate 10 of the enriching section 1 and upper ends of tubes 23 of the additional lower rectification section 19 are sunken in the upper tube plate 21 of the additional lower rectification section 19. The upper part of orifices in the upper tube plate 21 of the additional lower rectification section 19 has a bigger diameter than a diameter of tubes 8 for deepening to insert lower ends of tubes 8 of the enriching section 1 (FIG. 7). In another option, tubes 23 of the additional lower rectification section 19 are connected to tubes 8 of the enriching section 1 with the help of threaded connections (FIG. 8). Tubes can be connected in any known manner, for example, with the help of bayonet connectors, press fitting, welding and so on. While the tubular spaces 12 of tubes 8 and tubular spaces 25 of the tubes 23 are interconnected, the annular space 11 of the enriching section 1 is separated from the annular space 24 of the additional lower rectification section 19, as far as shown in FIGS. 1 to 3 and 7, 8.

Filling elements of all tubes 8 and 23 are made in the form of turbulators 16 that have deflecting elements for vapors rotation. FIG. 9 shows a turbulator in the form of a rod or a tube 31 with hooked arms or ends 32 n FIG. 10 there is a turbulator in the form of a tapered rod or a tube 31 with a cross-section expanding in the upper direction and hooked arms or ends 32 n FIG. 11 there is a turbulator in the form of step-up rods or tubes 31 with a cross-section expanding in the upper direction and hooked arms or ends 32 n FIG. 12 there is a turbulator in the form of step-up rods or tubes 31 with a cross-section expanding in the upper direction and hooked arms or ends 32. In this case the upper part of rods or tubes has spiral slots or coiled spirals. FIG. 13 presents some forms of hooked arms or ends of turbulators. A turbulator 16 can be made in another way and have other forms of hooked arms or ends.

Figure 14:
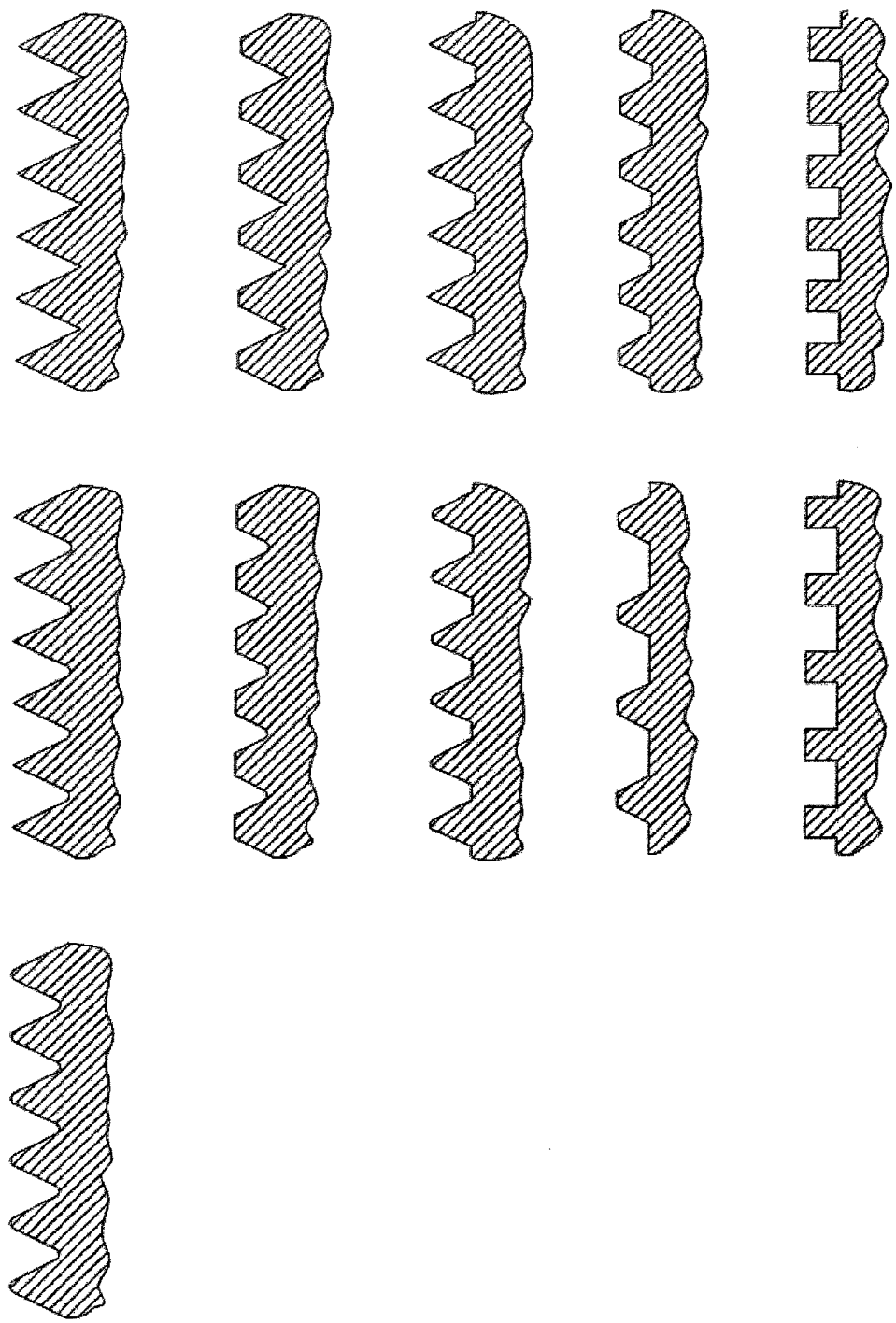
FIG. 14 Types of some threaded and spiral slots on surfaces of tubes.

Slots can be made on external 8A and/or internal 8B surfaces along the whole length of tubes 8 and 23, for example, threaded slots or spiral slots of different forms and with a different pitch (FIG. 14). According to another option, a winding-up can be made on external 8A and/or internal 8B surfaces along the whole length of tubes 8 and 23. According to a third option, external 8A and/or internal 8B surfaces along the whole length of tubes 8 and 23 can be covered with a porous coating. According to a fourth option, external 8A and/or internal 8B surfaces along the whole length of tubes 8 and 23 can be covered with an oxide coating. Different combinations of coating and slot forms are possible on different surfaces of different tubes.

The rectification column (FIG. 1, 2, 3) may be supplied with a vapors-in device 33, a stripping section 34 and a device for liquid fraction discharge 35 from the rectification tower (being still part of the tower). A feed-in device 33 may be made in the form of a cylindrical body 33A with elements (not shown in detail) for junction with other parts of the rectification tower 100. The feed-in device 33 contains one or several vapors supplies 4 and may be made in the form of pipes or connection points. The vapors supplies 4 can be connected to the body 33A in radial or tangential way. A stripping section 34 can be made of any known heat and mass exchange elements, for example, of mass-transfer plates, regular, tubular or dumped packing. In FIGS. 1 to 3, a version with vertical tubes 34A between upper 34B and lower 34C tube plates inside of a body 34D are shown. A device 35 for liquid fraction discharge from the rectification tower 100 can be made in the form of a cylindrical body 35A with elements (not shown) for junction with the stripping section 34. In the lower part of the body 35A or at the bottom of the device 35 for a liquid fraction discharge from the rectification tower 100, there is a fluid extraction 5 from the tower made in the form of a pipe or a connection point.

Figure 15:
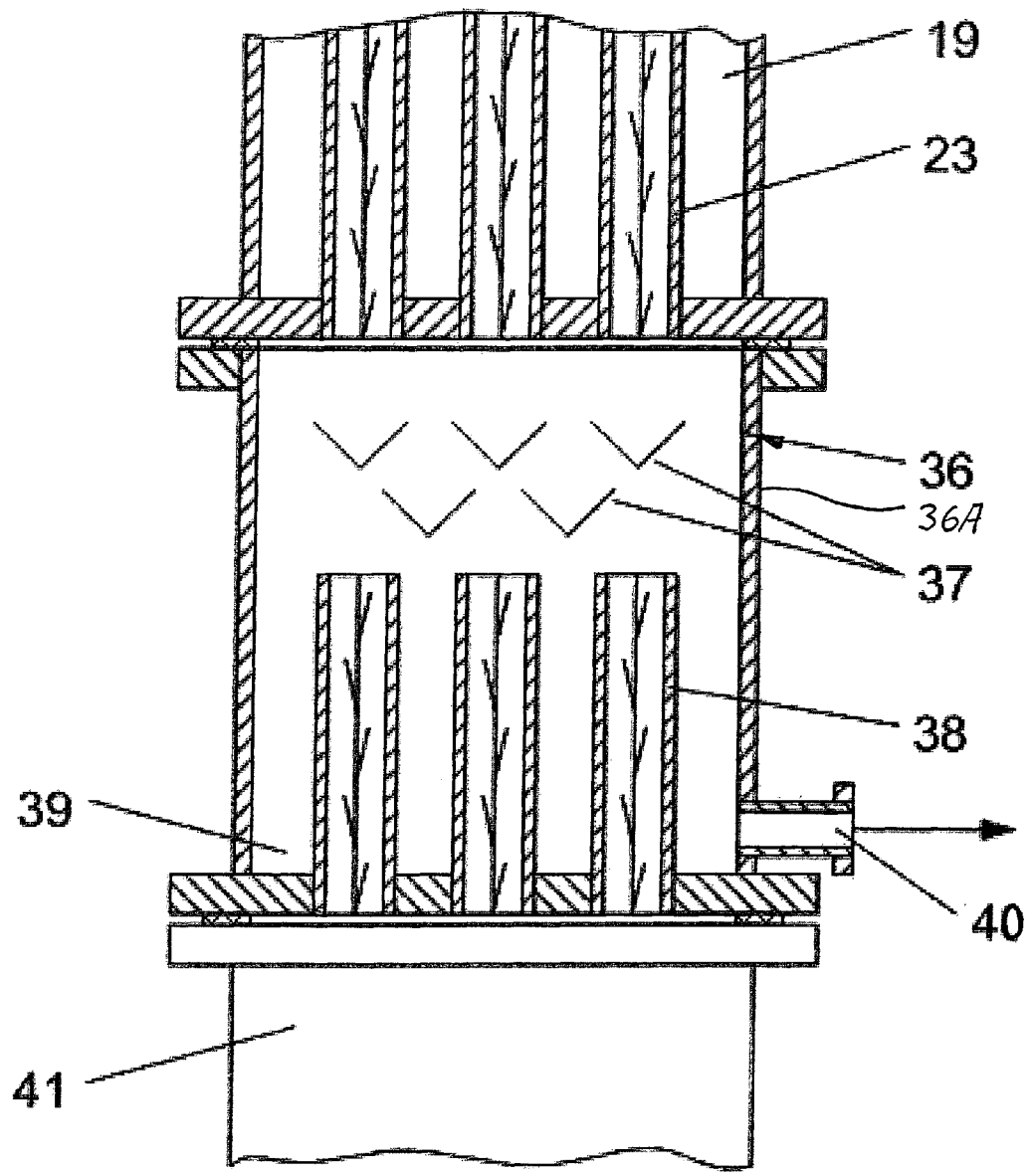
FIG. 15 A device for intermediate fraction extraction.

In the rectification tower 100 there is a possibility for an intermediate fraction extraction, as an option, if it is necessary. FIG. 15 presents one of the variants of the device 36 for an intermediate fraction extraction. There are elements for fluid fraction extraction 37 from tubes 23 of the additional lower rectification section 19 in the device 36. Elements 37 can be done in any known manner, for example, in the form of trays located above tubes 38. The liquid fraction is extracted from the bottom part 39 through an outlet 40 of the device 36. Tubes 38 are made with open upper ends for vapors rise from the additional mass exchange section 41 located below the device 36. Trays may be arranged in rows. There are gaps between trays 37 sufficient for a vapors passage. The device 36 can have two or more rows of trays. Rows are arranged in such a way that trays of the lower row overlap gaps between trays of the upper row, as it is shown in FIG. 15. The distance between rows is sufficient for a free passage of vapors. Orifices of different forms are made along the tray edges in places of junction to the body 36A of the device 36 for fluid flowing from trays.

An additional mass exchange section 41 can be made of different heat and mass exchange elements, for example, of mass-transfer plates, regular, tubular or dumped packing.

FIG. 16 presents a flow chart of the rectification tower with one side extraction of intermediate fraction. The rectification tower 100 consists of the enriching section 1 with vapors extraction 3, the additional lower rectification section 19, the device for intermediate fraction extraction 36 with the intermediate fraction removal 40, the additional mass exchange section 41, the vapors-in device 33 with feed supply 4, the stripping section 34 and the device for liquid fraction discharge 35 from the rectification section with liquid removal 5. The device for intermediate fraction extraction 36 is connected to the additional lower rectification section 19 and attached to the additional mass exchange section 41. The vapors-in device 33, the stripping section 34 and the device for liquid fraction extraction 35 from the rectification tower are added to the section 41 in a sequential order.

FIG. 17 shows a flow chart of the rectification tower with two side extractions of intermediate fractions. The rectification tower consists of the enriching section 1 with vapors extraction 3, the additional lower rectification section 19, the device for extraction of the first intermediate fraction 36 with removal of the first intermediate fraction 40, the first additional mass exchange section 41, the device for extraction of the second intermediate fraction 36 with removal of the second intermediate fraction 40, the second additional mass exchange section 41, the vapors-in device 33 with feed supply 4, the steaming section 34 and the device for liquid fraction extraction 35 from the rectification tower with fluid removal 5. The device for the first intermediate fraction extraction 36 is connected to the additional lower rectification section 19 and attached to the first additional mass exchange section 41. The device for the second intermediate fraction extraction 36 is connected to the first additional mass exchange section 41 and attached to the second additional mass exchange section 41. The vapors-in device 33, the steaming section 34 and the device for liquid fraction extraction 35 from the rectification tower are added to the second section 41 in a sequential order.

FIG. 18 shows a flow chart of the rectification tower with three side extractions of intermediate fractions. The rectification tower consists of the enriching section 1 with vapors extraction 3, the additional lower rectification section 19, the device for the first intermediate fraction extraction 36 with removal of the first intermediate fraction 40, the first additional mass exchange section 41, the device for the second intermediate fraction extraction 36 with removal of the second intermediate fraction 40, the second additional mass exchange section 41, the device for the third intermediate fraction extraction 36 with removal of the third intermediate fraction 40, the third additional mass exchange section 41, the vapors-in device 33 with feed supply 4, the stripping section 34 and the device for liquid fraction extraction 35 from the rectification column with fluid removal 5. The device for the first intermediate fraction extraction 36 is connected to the additional lower rectification section 19 and attached to the first additional mass exchange section 41. The device for the second intermediate fraction extraction 36 is connected to the first additional mass exchange section 41 and attached to the second additional mass exchange section 41. The device for the third intermediate fraction extraction 36 is connected to the second additional mass exchange section 41 and attached to the third additional mass exchange section 41. The vapors-in device 33, the stripping section 34 and the device for liquid fraction extraction 35 from the rectification column are added to the third section 41 in a sequential order.

By adding a bundle of devices for intermediate fraction extraction 36 connected in series with additional mass exchange sections 41 to the rectification tower, you can provide for an extraction of any number of intermediate fractions.

The sections of the rectification tower can be made of construction materials that satisfy requirements for material reliability, thermal conductivity, resistance to chemical agents and corrosion resistance. The sections of the rectification tower can be connected to each other through gaskets.

Working: The rectification tower (FIG. 1) works as follows. A multi-component mixture (a feed) consisting of lower-boiling and higher-boiling fractions in the form of a gas/vapors and/or fluid in the boiling condition is fed into the vapors-in device 33 through a feed supply 4. Vapor goes up through the tubular space 25 of tubes 23 of the additional lower rectification section 19 and then goes further through the tubular space 12 of tubes 8 of the enriching section 1. Vapor of the higher-boiling fractions and a part of lower-boiling fractions is condensed along the whole length of internal surfaces 8B of tubes 8. The heat from condensing vapors is transferred through walls of tubes 8 to their external surfaces 8A.

A heat carrier fluid in the boiling or a pre-boiling condition is supplied to the external surface 8A of tubes 8 through the distributor 15 from the distribution chamber 17. The heat carrier fluid flows down along the external surfaces 8A of tubes 8 in the form of a thin film from the distributor 17 down to the lower tube plate 10 of the rectification (enriching) section 1. In this case the heat is transferred from the tubular space 12 to the annular space 11 with the help of boiling fluid (the heat carrier) on the external surfaces 8A of tubes 8. The vapor of the boiling heat carrier fluid enters the annular space 11 and is supplied to the vapors condenser 18 of the heat carrier through the upper outlet 13.

The vapor of the heat carrier is condensed at the temperature of boiling heat carrier fluid in the condenser 18. The condensed vapors of the heat carrier in the pre-boiling condition flows by gravity into the heat carrier tank 6 which communicates with condenser 18 (FIGS. 1 and 3) or has a common space with it (FIG. 2). The residue of non evaporated heat carrier flowing down the external surfaces 8A of tubes 8 is gathered at the bottom of the annular space 11 confined by the lower tube plate 10 of the enriching section 1 and flows by gravity into the heat carrier tank 6 through the lower outlet 27.

The heat carrier is supplied from the tank 6 with the help of the pump 26 through the upper inlet 14 to the distribution chamber 17. The pump 26 creates the excessive pressure in the distribution chamber 17 in relation to the pressure in the annular space 11 of the enriching section 1. The heat carrier fluid in the pre-boiling condition under the excessive pressure preferably fill the whole space in the distribution chamber 17, and due to this it is evenly expanded through all gaps between orifices of the distributor 15 and external surfaces 8A of tubes 8 into the annular space 11 where the pressure is lower (FIG. 4). As a result of the change in pressure between the distribution chamber 17 and the annular space 11 the fluid begins to boil on external surfaces 8A of tubes 8 immediately after emerging from gaps S. Sizes of gaps and pump operation 26 provide for the necessary change in pressure.

Thanks to radial gaps (FIG. 5) the heat carrier fluid is evenly distributed on the external surface of tubes 8 in the form of a thin film which ensures a uniform and efficient heat extraction from the tubular space 12 along the whole length of tubes 8. Gaps S between orifices O of the heat carrier fluid distributor 15 and the external surface 8A of tubes 8 can be made by vertical channels along the perimeter of the distributor orifices O, at least, two per each orifice (FIG. 6). In this case the heat carrier fluid is evenly distributed on the external surface 8A of tubes 8. Thanks to threaded and spiral slots of different forms (FIG. 14) or winding-up and/or porous coating, and/or oxide coating, the down-flow of the heat carrier fluid along the external surfaces 8A can be improved. In other words, threaded and spiral slots of different forms or winding-up on the external surfaces 8A of tubes 8 help to ensure more efficient heat transfer from this surface.

To create necessary conditions for heat transfer between internal 8B and external 8A surfaces of tubes 8, the pressure is ensured in the annular space 11 as follows A device 29 connected to the vapors condenser 18 of the heat carrier reduces the pressure in the condenser 18 and, consequently, in the heat carrier tank 6 and in the annular space 11 of the enriching section 1 that communicate with the condenser 18. For more precise regulation of pressure in the annular space 11, the pressure control valve 28 provides for additional gas intake into the annular space 11 from the atmosphere or from an external source of gas (not shown in the drawing). The additional gas intake into the annular space 11 in the necessary amount can reduce a vacuum created by the device 29 and get a necessary pressure. The annular space 11 of the enriching section 1 can also work under atmospheric pressure. The intensity of heat transfer from the tubular space 12 to the annular space 11 may be ensured by the selection of a heat carrier with the appropriate boiling temperature. If it is necessary, it is possible to change the direction of the heat transfer from the annular space 11 to the tubular space 12 by creating an excessive pressure in the annular space 11. In this case an excessive pressure is created by the device 29 designed for pressure increase. An excessive pressure from the annular space 11 is released into the atmosphere through the pressure control valve 28.

It is also possible to change pressure in the tubular space 12 of the rectification tower so that to amplify the difference in pressure between the tubular space 12 and the annular space 11. The change in pressure in the tubular space 12 is made in any known way applicable for the rectification tower.

In addition to flow charts described above, in FIG. 1, 2 it is possible to make a flow chart/characteristics of the rectification tower where the heat carrier vapor condenser communicates with the annular space 11 and tubular space 12 of the enriching section 1 (FIG. 3). This flow chart differs from the previous ones by the fact that a distillate of the lower-boiling fraction is used as a heat carrier. In this case distillate vapor is discharged from the tower cover 2 through the heat carrier vapor extraction 3 directly to the vapor condenser 18 of the heat carrier. The heat carrier vapor comes from the annular space 11 through the vapor extraction 3 to the same part of the condenser 18. The distillate vapor is partially or completely condensed in the vapor condenser 18 of the heat carrier and then enters the heat carrier tank 6. The non evaporated part of the heat carrier from the lower part of the annular space 11 enters the heat carrier tank through 6 the lower outlet 27. Then this distillate in the form of fluid and vapor leaves the tank 6 for further condensation and cooling through the connection point 30. A part of the distillate as a heat carrier is supplied by the pump 26 to the distribution chamber 17 through the inlet 14 from the heat carrier tank 6. And then this flow chart looks similar to the described above charts in FIG. 1, 2.

Heat and Mass Exchange in the Rectification Tower:

The heat and mass exchange in the rectification tower is carried out in the following way. In case that the process progresses in the film mode with internal reflux generation along the whole length of tubes, i.e. an external reflux is not supplied to the head of the tower in contrast to the standard rectification. In rectification processes a reflux is understood as a liquid stream of condensed vapor of separated fractions and is an integral part of the heat and mass exchange process in the rectification tower.

A pressure decrease in the annular space 11 results in the decrease of the boiling temperature of the heat carrier flowing down along the external surfaces 8A of tubes 8 and, consequently, in the decrease of the internal surface (8B) temperature of tubes 8. It follows a vapor condensation of higher-boiling fractions and a part of lower-boiling fractions on the internal surfaces of tubes 8 along their lengths. Some heat generated during the vapor condensation is consumed for the second evaporation of the lower-boiling fraction; the rest of it is transferred through walls of tubes 8 to the external surfaces 8A and then transferred to the annular space 11 with the vapor of the boiling heat carrier. The condensed vapor of the higher-boiling fraction and a part of the lower-boiling fraction generates the reflux that flows along the internal 8B and external 8A surfaces of tubes 8 in the form of a thin film.

Threaded and spiral slots of different forms (FIG. 14) or winding-up and/or porous coating and/or oxide coating cover the internal surfaces 8B of tubes 8 along their length. It improves an even distribution of fluid along the whole internal surface 8B of tubes 8 in the form of a thin film. Thus the reflux is generated directly inside the rectification tower on the internal surface 8B of tubes 8 along their length. Flowing down in the form of a thin film, the reflux interacts with the vapor rising up along the tubular space 12. As a result of the heat and mass exchange between vapor and reflux, the reflux is enriched with the higher-boiling fractions as it flows down and the rising vapor is enriched with the lower-boiling fractions. As a result the vapor coming from the tubular space 12 consists of lower-boiling fractions.

The vapor gathers in the cover 2 of the rectification tower and is extracted for condensation and cooling through the vapor extraction 3.

Deflecting Elements:

Turbulators 16 in tubes 8, 23, 38 contain deflecting elements, particularly in the form of hooked arms or ends (FIG. 9) for swirling a steam stream that goes up. Hooked arms or ends can be of different forms subject to necessary parameters of the mass exchange process in the tower (FIG. 13). These parameters also determine a number and a pitch of hooked arms or ends 32 fixed to a rod 31. The vertical movement of vapors and its swirling in the radial plane when it interacts with threaded and spiral slots of tubes provide for not only a spiral rotation of a vapor stream but a vertical radial rotation of a vapor stream along the spiral movement line of vapor. Such a rotation ensures an efficient turbulation of vapor in the near-wall space and multiple intensification of the vapor interaction with the reflux film that improves the heat and mass exchange efficiency. A spiral rotation of vapor also provides for a centrifugal cleaning of vapor from drop entrainment from the tubular space.

A reflux in the form of a thin film accelerates diffusion mass exchange processes in fluid. The intensified interaction of vapor with reflux with the help of turbulators 16 significantly accelerates the mass exchange process between them.

Besides, threaded and spiral slots on the internal surface of tubes increases the stall resistance of the reflux film to counter vapor flow.

As vapor moves up inside along the tubes 8, its amount reduces as far as some vapor condensates into reflux. In this case the speed of the vapor flow can slow down and, consequently, rotation and turbulation parameters deteriorate. With the purpose to maintain a stable high speed of the vapor flow along the whole length of tubes, the vapor reduction can be compensated by a corresponding restriction in the cross-section of the tubular space from bottom to top. For this purpose a turbulator 16 can be made in the form of a tapered or steped rod or a tube 31 with a cross-section expanding in the upper direction and hooked arms or ends 32 (FIG. 10). A similar result can be achieved if we use turbulators 16 made in the form of steped rods or tubes 31 with a cross-section expanding in the upper direction and hooked arms or ends 32 (FIG. 11). The vapor amount and speed can be significantly reduced if a vapor mixture distilled in the rectification tower contains a small amount of lower-boiling fractions. It will require a significant restriction of the cross section of the tubular space 12 in the upper part of the tubes 8. In this case turbulators can have an additional rod 31 with spiral slots in the upper part or can be made with a coiled spiral (FIG. 12).

The additional lower rectification section: Further, the reflux from the tubular space 12 of the enriching section 1 enters the tubular space 25 of the additional lower rectification section 19. The heat and mass exchange in the tubular space 25 is similar to the heat and mass exchange described above in the tubular space 12. A distinctive feature of the heat and mass exchange in the additional lower rectification section 19 is characterized by the fact that all heat extracted in vapor condensation on the internal surfaces of tubes 23 is completely used for the second evaporation of lower-boiling fractions. It makes possible to clean the reflux from lower-boiling fractions at most. The height of the additional lower rectification section 19 is determined by the conditions necessary for the heat and mass exchange in the rectification tower.

Common and continuous tubular space for the heat and mass exchange: To make a common and continuous tubular space for the heat and mass exchange along the whole length of tubes 23 and 8, tubes are positioned in coaxial relation one above another in the corresponding parts of the sections 1 and 19. For the complete transfer of the reflux from the upper tubes 8 to the corresponding tubes 23, the lower ends of tubes 8 of the rectifying section 1 may go beyond the end of the lower tube plate 10 of the enriching section 1 and upper ends of tubes 23 are sunken in the upper tube plate 21 of the additional lower rectification section. The upper part of orifices in the upper tube plate 21 of the additional lower rectification section 19 has a bigger diameter than a diameter of tubes 8 for deepening to insert lower tube 8 ends of the enriching section 1 (FIG. 7). Such a unit design provides for the flow of reflux from upper tubes 8 directly to corresponding tubes 23 and eliminates the possibility for reflux to flow from tubes 8 to the other tubes 23.

It helps to create conditions for an even heat and mass exchange for any number of tubes in the rectification tower, i.e. it ensures a high uniformity of the process across the cross-section of the column. Besides, the same result is achieved in the tower where tubes 23 of the additional lower rectification section 19 are connected with tubes 8 of the enriching section 1, for example, with the help of threaded or other connections.

Stripping section: Reflux enters the stripping section 34 from the additional lower rectification section 19 through a feed-in device 33 (FIG. 1, 2, 3). An evaporated part of a feed supplied to the rectification tower through a vapor supply 4 enters the stripping section 34. The final stripping of a lower-boiling fraction residue from higher-boiling fractions takes place in this section 34. The stripping can be made with the help of a natural stripping of lower-boiling fractions and with the help of a forced supply of heat to the section 34 made in any known way appropriate for the operation of the rectification tower. A stripping section 34 can be made of any known heat and mass exchange elements, for example, of mass-transfer plates, regular, tubular or dumped packing.

A clean higher-boiling fraction is gathered in a device 35 for the discharge of a liquid fraction from the rectification tower where it is pumped out through the extraction 5.

The operation of the rectification tower is illustrated by the following examples shown in FIG. 1, 2, 3.

Example 1

A base mixture (the feed) in the form of an aqueous solution of ethanol was rectified in a continuous mode in the rectification tower (FIG. 1). The mixture was rectified in two different modes characterized by a different degree of flux generation in the enriching section 1.

As a result of this rectification the following products were obtained: an ethanol distillate was extracted from the extraction 3 and a still fraction—an aqueous solution with a small concentration of ethanol (a distillation residue) was extracted from the extraction 5. Table #1 presents the results of this water—ethanol mixture rectification in modes 1, 2.

TABLE 1

The results of the water - ethanol mixture rectification

| | Mode # 1, ethanol concentration in % | Mode #2, ethanol concentration in % |
| --- | --- | --- |
| Feed stock | 9.96 | 9.79 |
| Distillate | 90.62 | 93.53 |
| Distillation residue | <0.01 | 0.15 |

Example 2

A mixture of silanes consisting of dichlorosilane, trichlorosilane and silicon tetrachloride was rectified in a continuous mode in the rectification tower (FIG. 2).

As a result of this rectification the following products were obtained: a target distillate was extracted from the extraction 3 and a still fraction (a distillation residue) was extracted from the extraction 5. Table #2 shows the results of this silanes mixture rectification.

TABLE 2

The results of the silane mixture rectification

| | Base mixture, mass percent % | Distillate, mass percent % | Distillation residue, mass percent % |
| --- | --- | --- | --- |
| Dichlorosilane $SiH_2Cl_2$ | 1 | 2.5 | 0 |
| Trichlorosilane $SiHCl_2$ | 39 | 97.15 | 0.23 |
| Silicon tetrachloride $SiCl_4$ | 60 | 0.35 | 99.77 |

The energy cost per unit for the mixture rectification in the proposed rectification tower was equal to 384 W/kg according to Table #2. At the same time the cost per unit for the rectification of a similar mixture in the standard plate-type rectification tower amounts to 500 W/kg, i.e. 1.3 times higher.

As it is shown in the stated examples, the composition of the lower-boiling fraction (a distillate) and the higher-boiling fraction (a distillation residue) depends on the composition of a cut mixture (examples 1, 2) and rectification modes (example 1).

If it is necessary, it is possible to extract intermediate fractions in the rectification tower. Such an extraction is possible with the help of a device 36 that is attached to the lower part of the additional lower rectification section 19. An additional mass exchange section 41 is installed between this device and a feed-in device 33 to increase the operation efficiency of the device 36 (FIG. 15). Vapor of the cut mixture enters the additional mass exchange section 41 from the feed-in device 33.

In this case reflux flows down from tubes 23 and gravitates to the space of the device 36 which has elements 37 for liquid fraction discharge. According to this option, elements 37 are made in the form of trays. Reflux falls into trays 37 and flows to orifices located along the edges of trays 37. Then reflux flows from trays 37 through drain holes into the bottom part of the annular space 39. Thus trays 37 prevent liquid fractions from falling out of tubes 23 into open tubes 38 located in the device 36. Reflux is accumulated at the bottom of the annular space 39 up to a certain level. Vapors of the cut mixture goes up in tubes 38 from the additional mass exchange section 41 and brings the reflux at the bottom part of the annular space 39 to boiling. In the process of boiling the reflux is additionally stripped from the lower-boiling fractions and in the result of this process an intermediate fraction is obtained that consists of the higher-boiling fractions and the lower-boiling fractions in a proportion different from the cut mixture (a raw material). An intermediate fraction is extracted from the device 36 through a connection point 40. The level of fluid in the annular space 39 determines the intensity of the additional stripping of an intermediate fraction due to the change in a contact area of fluid with external surfaces of tubes 38 and is regulated by the speed of an intermediate fraction extraction through the connection point 40.

The additional mass exchange section 41 can be made of any known heat and mass exchange elements, for example, of mass-transfer plates, regular, tubular or dumped packing. Vapor rising in the tubular space of tubes 38 is rotated by turbulators 16 with the purpose to prevent from the entrainment of the drop phase from the additional mass exchange section 41 to the device 36. The drop phase under the centrifugal force is accumulated on the internal walls of tubes 38 and flows down to the additional mass exchange section 41. Also due to boiling in the bottom part of the annular space 39, the heat is also extracted from the tubular space 38 to the annular space of the device 36 for intermediate fraction discharge. In this case some vapor of the higher-boiling fractions is condensed on the internal surfaces of tubes 38 and flows down to the additional mass exchange section 41 ensuring its reflux. Besides, if it is necessary, a part of an intermediate fraction flow extracted through a connection point 40 can be used for reflux of the additional mass exchange section 41. The reflux is supplied to the upper part of the additional mass exchange section 41 in ways known and used in operation of rectification towers. Some lower-boiling fractions are passed from reflux to vapor in the additional mass exchange section 41.

Rectification tower with one side extraction: The rectification tower with one side extraction of an intermediate fraction (FIG. 16) operates as follows. A multi-component mixture (the feed) in the form of vapor and/or boiling fluid is supplied to a feed-in device 33 through a feed supply 4. A vapor mixture of the higher-boiling fractions and the lower-boiling fractions goes up through the additional mass exchange section 41. In this section vapor interacts with reflux flow. In this interaction the vapor is enriched with the lower-boiling fractions contained in the reflux in this part of the tower. Further vapor goes through the tubular space of the device 36 for intermediate fraction extraction and rises to the additional lower rectification section 19 and then to the enriching section 1. Vapor is enriched with the lower-boiling fractions in the additional lower rectification section 19 and in the enriching section 1 and flowing down reflux is enriched with the higher-boiling fractions. Reflux flows into the bottom part of the device 36 for intermediate fraction extraction from the additional lower rectification section 19 and a target intermediate fraction is extracted through extraction place 40. Vapor of the lower-boiling fraction being a target product is extracted from the enriching section 1 through an extraction place 3. Reflux flowing from the additional mass exchange section 41 enters the stripping section 34 through the feed-in device 33. A liquid phase of the feed incoming to the tower through a supply 4 enters the same section. In the stripping section 34 a liquid phase is stripped from a lower-boiling fraction residue and highly enriched higher-boiling fractions in a liquid state enter a device 35 for liquid fraction discharge from the rectification tower. A target higher-boiling fraction in a liquid state is extracted from the device 35 for liquid fraction discharge from the rectification tower through the extraction place 5.

The operation of the rectification tower with one intermediate fraction extraction shown in FIG. 16 is illustrated by the following examples.

Example 3

Crude oil with the density of 825.2 kg/m$^3$ was rectified in the continuous mode in the rectification tower with one intermediate fraction extraction (FIG. 16). Crude oil has the following fractional composition:

TABLE 3

| Fractional composition of the crude oil | |
|---|---|
| Liquid volume at boiling point, % | Boiling temperature, ° C. |
| Initial boiling point | 55 |
| 10 | 105 |
| 20 | 141 |
| 30 | 176 |
| 40 | 218 |
| 50 | 271 |
| 60 | 315 |
| 70 | 350 |

The fractional composition of complex multi-component mixtures is shown in the relationship of a boiling away product quantity to a boiling temperature increase according to GOST 2177 (Russia) and ASTM D-86 (USA).

Water steam was not used in the process. According to mode 1 the crude oil was rectified in the mode of a maximum stripping of a diesel oil fraction. According to mode 2 the oil was rectified in the mode of a maximum extraction of a diesel oil fraction.

As a result of this rectification the following products were obtained: a gasoline fraction was extracted from the extraction place 3, a diesel oil fraction was extracted as an intermediate fraction from the extraction place 40 and black oil was extracted as a distillation fraction from the extraction place 5. Table 4 shows a material balance of the crude oil rectification in modes 1, 2. Tables 5, 6 present main characteristics of gasoline and diesel oil fractions obtained in crude oil rectification.

TABLE 4

Material balance of crude oil rectification

|  | Mode 1 | Mode 2 |
|---|---|---|
| Gasoline, mass percent % | 24.61 | 20.45 |
| Diesel fuel, mass percent % | 38.71 | 45.29 |
| Black oil, mass percent % | 36.68 | 34.26 |
| Total, mass percent % | 100 | 100 |
| Including light fractions extraction, mass percent % | 63.32 | 65.74 |

TABLE 5

Fractional composition of the gasoline

| Liquid volume at boiling point, % | Mode 1 Boiling temperature, ° C. | Mode 2 Boiling temperature, ° C. |
|---|---|---|
| Initial boiling point | 32 | 33 |
| 10 | 71 | 64 |
| 20 | 83 | 76 |
| 30 | 94 | 85 |
| 40 | 103 | 94 |
| 50 | 112 | 101 |
| 60 | 120 | 109 |
| 70 | 130 | 115 |
| 80 | 140 | 130 |
| 90 | 158 | 145 |
| End boiling point | 170 | 158 |
| Residue, ml | 1.4 | 1.3 |

TABLE 6

Fractional composition of the diesel oil

| Liquid volume at boiling point, % | Mode 1 Boiling temperature, ° C. | Mode 2 Boiling temperature, ° C. |
|---|---|---|
| Initial boiling point | 172 | 145 |
| 10 | 191 | 168 |
| 20 | 208 | 186 |
| 30 | 221 | 204 |
| 40 | 237 | 255 |
| 50 | 256 | 246 |
| 60 | 273 | 266 |
| 70 | 291 | 278 |
| 80 | 314 | 312 |
| 90 | 343 | 345 |
| 96 | 360 | 360 |
| Flash point, ° C. | 57 | 40 |

Example 4

Crude oil with the density of 837.7 kg/m³ was rectified in the continuous mode in the rectification tower with one intermediate fraction extraction (FIG. 16). Crude oil has the following fractional composition:

TABLE 7

Fractional composition of the crude oil

| Liquid volume at boiling point, % | Boiling temperature, ° C. |
|---|---|
| Initial boiling point | 42 |
| 10 | 105 |
| 20 | 148 |
| 30 | 195 |
| 40 | 245 |
| 50 | 296 |
| 60 | 346 |
| 64 | 350 |

Water steam was not used in the process. The crude oil was rectified in the mode of a maximum stripping of diesel oil fraction.

As a result of this rectification the following products were obtained: the gasoline fraction in the quantity 24.54% (mass percent) was extracted from the extraction place 3, the diesel oil fraction was extracted in the quantity of 35.59% (mass percent) as an intermediate fraction from the extraction place 40 and a black oil in the quantity of 39.87% (mass percent) was extracted as a distillation fraction from the extraction place 5.

Tables 8, 9 present main characteristics of gasoline and diesel oil fractions obtained in oil rectification.

TABLE 8

Fractional composition of the gasoline

| Liquid volume at boiling point, % | Boiling temperature, ° C. |
|---|---|
| Initial boiling point | 35 |
| 10 | 65 |
| 20 | 79 |
| 30 | 90 |
| 40 | 102 |
| 50 | 111 |
| 60 | 119 |
| 70 | 127 |
| 80 | 140 |
| 90 | 157 |
| End boiling point | 183 |
| Residue, ml | 0.9 |

TABLE 9

Fractional composition of the diesel oil

| Liquid volume at boiling point, % | Boiling temperature, ° C. |
|---|---|
| Initial boiling point | 176 |
| 10 | 198 |
| 20 | 214 |
| 30 | 228 |
| 40 | 244 |
| 50 | 261 |
| 60 | 277 |
| 70 | 298 |
| 80 | 315 |
| 90 | 339 |
| 96 | 358 |
| Flash point, ° C. | 61 |

As it is shown by the presented examples, the yield of lower-boiling, higher-boiling and intermediate fractions depends on the composition of the cut mixture (examples 3, 4) and rectification modes (example 3). Besides, it is evident from examples 3, 4 that the rectification in the film mode with the internal reflux generation along the whole length of tubes 8 provides for a high sharpness of fractionation of multi-component mixtures (a gasoline fraction and a diesel oil fraction).

Rectification tower with two side extractions of intermediate fractions: The rectification tower with two side extractions of intermediate fractions (FIG. 17) differs in the first device 36 for intermediate fraction extraction and the first additional mass exchange section 41 and below there are the second device 36 for intermediate fraction extraction and the second additional mass exchange section 41. This tower operates like a tower with one side extraction. The first intermediate fraction is extracted from the first (upper) device 36 for intermediate fraction extraction through the first extraction place 40. The second intermediate fraction is extracted from the second device 36 for intermediate fraction extraction located below the first additional mass exchange section 41 through the second extraction place 40. In this case the second intermediate fraction contains less lower-boiling fractions than the first intermediate fraction.

The operation of the rectification tower with two extractions of intermediate fractions is presented in FIG. 17 and illustrated by the following example.

Example 5

Gas condensate with the density of 764.8 kg/m$^3$ was rectified in the continuous mode in the rectification tower with two side extractions of intermediate fractions (FIG. 17). Gas condensate has the following fractional composition:

TABLE 10

Fractional composition of gas condensate

| Liquid volume at boiling point, % | Boiling temperature, °C. |
|---|---|
| Initial boiling point | 42 |
| 10 | 82 |
| 20 | 99 |
| 30 | 112 |
| 40 | 130 |
| 50 | 149 |
| 60 | 175 |
| 70 | 209 |
| 80 | 252 |
| 90 | 313 |
| End boiling point | 323 |

Water steam was not used in the process. Gas condensate was rectified with extraction of two intermediate fractions.

As a result of this rectification the following products were obtained: the gasoline fraction was extracted from the extraction place 3, the kerosene cut as the first intermediate fraction was extracted from the first extraction place 40, a diesel oil fraction as the second intermediate fraction was extracted from the second extraction place 40 and a distillation fraction as a distillation residue was extracted from the extraction place 5.

Tables 11, 12, 13 present main characteristics of gasoline, kerosene and diesel oil fractions obtained in gas condensate rectification.

TABLE 11

Fractional composition of the gasoline

| Liquid volume at boiling point, % | Boiling temperature, °C. |
|---|---|
| Initial boiling point | 31 |
| 10 | 58 |
| 20 | 72 |
| 30 | 85 |
| 40 | 98 |
| 50 | 104 |
| 60 | 123 |
| 70 | 135 |
| 80 | 147 |
| 90 | 169 |
| End boiling point | 174 |
| Residue, ml | 0.7 |

TABLE 12

Fractional composition of the kerosene

| Liquid volume at boiling point, % | Boiling temperature, °C. |
|---|---|
| Initial boiling point | 137 |
| 10 | 155 |
| 20 | 160 |
| 30 | 165 |
| 40 | 169 |
| 50 | 173 |
| 60 | 176 |
| 70 | 185 |
| 80 | 192 |
| 90 | 205 |
| End boiling point | 234 |
| Residue, ml | 1.0 |
| Flash temperature, °C. | 32 |

TABLE 13

Fractional composition of the diesel oil

| Liquid volume at boiling point, % | Boiling temperature, °C. |
|---|---|
| Initial boiling point | 191 |
| 10 | 209 |
| 20 | 222 |
| 30 | 235 |
| 40 | 247 |
| 50 | 261 |
| 60 | 279 |
| 70 | 296 |
| 80 | 319 |
| 90 | 350 |
| 96 | 360 |
| Flash temperature, °C. | 75 |

As it is evident from example 5, the composition of the second intermediate fraction contains less lower-boiling fractions than the composition of the first intermediate fraction that is demonstrated by the change in the cut point and the flash temperature of the first fraction (kerosene fraction) and the second fraction (diesel oil fraction).

Rectification tower with three side extractions of intermediate fractions: The rectification tower with three side extractions of intermediate fractions (FIG. 18) differs in the first device 36 for intermediate fraction extraction and the first additional mass exchange section 41; below there are the second device 36 for intermediate fraction extraction and the second additional mass exchange section 41; below them there are the third device 36 for intermediate fraction extraction and the third additional mass exchange section 41. This column operates like a column with one side extraction. The first intermediate fraction is extracted from the first (upper) device 36 for intermediate fraction extraction through the first extraction place 40. The second intermediate fraction is extracted from the second device 36 for intermediate fraction extraction I through the second extraction place 40. The third intermediate fraction is extracted from the third device 36 for intermediate fraction extraction I through the third extraction place 40. In this case the third intermediate fraction contains less lower-boiling fractions than the second intermediate fraction.

Thus, in extraction of several intermediate fractions, each subsequent intermediate fraction contains less lower-boiling fractions and an intermediate fraction with the least number of lower-boiling fractions is extracted before the steam-in device 33 of the cut mixture.

Result:

This invention greatly improves the efficiency of the heat and mass exchange in the rectification tower of the proposed design which helps to conduct the heat and mass exchange in the film mode with the internal reflux generation along the whole length of tubes.

The economic efficiency is increased due to the following technical results of the invention. As far as the heat and mass exchange is done with a high intensity per unit of area, it helps to reduce the dimensions of the rectification tower by 2-5 times. Besides, a more intensive heat and mass exchange ensures a higher precision of multi-component mixture separation into separate fractions which helps to reduce the number of technological conversions in multi-component mixture processing. The internal reflux generation helps to exclude the forced circulation of rectification in the tower and therefore helps to reduce power consumption for the rectification by 25-30%. As a whole, it reduces construction, installation and operation costs of the rectification.

LIST OF REFERENCE NUMERALS

1 Enriching section
2 Cover
3 Steam extraction from tubular space (connection point)
4 Feed supply into tubular space (feed-in connection point)
5 Liquid extraction from tubular space (discharge connection point)
6 Heat carrier tank
7 Body
8 Tubes
8A external surfaces
8B internal surfaces
9 Upper tube plate of enriching section
10 Lower tube plate of enriching section
11 Annular space of enriching section
12 Tubular space of enriching section
13 Upper steam outlet from annular space (heat carrier steam)
14 Upper fluid inlet into annular space (heat carrier)
15 Fluid distributor
15A orifices
16 Filling elements (turbulators)
17 Distribution chamber
18 Vapor condenser of heat carrier
19 Additional lower rectification section
20 Body of additional rectification section
21 Upper tube plate of additional lower rectification section
22 Lower tube plate of additional lower rectification section
23 Tubes of additional lower rectification section
24 Annular space of additional lower rectification section
25 Tubular space of additional lower rectification section
26 Pump for heat carrier supply
27 Lower outlet of heat carrier from annular space
28 Pressure control valve
29 Device to increase/decrease pressure in annular space
30 Extraction of one fraction from heat carrier vessel (connection point)
31 Rods or tubes
32 Hooked arms or ends
33 feed-in device
33A body
34 Stripping section
34A tubes
34B upper tube plates
34C lower tube plates
34D body
35 Device for liquid phase discharge from rectification tower
35A body
36 Device for intermediate fraction extraction
36A body
37 elements for fluid fraction extraction
38 tubes
39 Bottom part of annular space
40 Intermediate fraction extraction (connection point)
41 Additional mass exchange section
100 rectification tower
S gap
O orifices
HE heat excharger
LF liquid fraction

The invention claimed is:

1. A method for the separation of a multi-component mixtures into fractions using a rectification tower with an internal heat and mass exchange, comprising the steps of
providing an enriching section made in the form of a vertical tubular heat exchanger that comprises heat and mass exchange tubes, said enriching section further comprising a body and tube plates, said tube plates being connected to said body, thus providing tubular spaces and an annular space, an upper heat carrier inlet into said annular space, an upper heat carrier steam outlet from said annular space being located below said upper heat carrier inlet, a lower heat carrier outlet, a heat carrier distributor that distributes fluid from said upper heat carrier inlet into the annular space and provides for said fluid flowing along external surfaces of said heat and mass exchange tubes, said heat and mass exchange tubes extending through orifices in said heat carrier distributor, said orifices leaving clearances between said heat carrier distributor and said external surfaces of said heat and mass exchange tubes, heat and mass exchange surfaces in said annular space are made by said external surfaces of said heat and mass exchange tubes between a lower tube plate up to said heat carrier distributor, said heat and mass exchange surfaces in said tubular spaces are made by internal surfaces of said heat and mass exchange tubes between said lower tube plate up to said heat carrier distributor, said rectification tower further comprises a feed supply to and a vapors extraction as well as a device for discharging of a liquid fraction from said tubular spaces,
supplying a vapor of said multi-component mixture which is to be rectified to said tubular spaces of said heat and mass exchange tubes and removing from said tubular spaces a rectified vapor portion;

characterized by, the steps of using vapor to tightly connect said heat carrier distributor to said body thus defining a distribution chamber that includes an annular space confined by said tube plate and said heat carrier distributor, providing fluid outlets to said distribution chamber in a form of said clearances between said distributor orifices and the external surfaces of said heat and mass exchange tubes, pressurizing said fluid within said distribution chamber, and holding a fluid pressure in said distribution chamber above said heat carrier distributor that is greater than a pressure in said annular space below said heat carrier distributor.

2. The method of claim 1, wherein said fluid is supplied under excess pressure into said distribution chamber under boiling or pre-boiling conditions.

3. The method of claim 1, wherein a drop in pressure conditions for instantaneous boiling of fluids on the external surfaces of tubes is provided when fluids go out through gaps in said annular spaces.

4. The method according to claim 1, wherein in an additional lower rectification section, heat and masses are exchanged in said tubular spaces, and heat from condensing steam of a separated mixture is consumed for re-evaporation of fractions from a wet reflux.

5. The method of claim 1, wherein pressure in a condenser and an eventual heat carrier tank and/or in said annular space of said enriching section that communicate with said condenser is reduced by a device connected to said condenser of said heat carrier distributor.

6. The method of claim 5, wherein for regulation of pressure in said annular space, additional gas intake into said annular space from the atmosphere or from an external source of gas is provided by a pressure control valve.

7. The method according to claim 1, wherein steam reduction in said tubular spaces is compensated by a corresponding restriction in a cross-section of said tubular spaces; thus maintaining a stable speed of steam flow along a length of said heat and mass exchange tubes.

8. The method according to claim 1, wherein a final stripping of a lower-boiling fraction from a higher-boiling fraction is carried out in a lower stripping section, said final stripping is facilitated by use of a natural stripping of lower-boiling fractions and/or with a forced supply of heat to said lower stripping section, said lower-boiling fraction having a boiling point that is less than a boiling point of said higher-boiling point fractions.

9. The method according to claim 1, wherein said vapor amount and speed is reduced by a steam mixture that is distilled in said rectification tower a cross section of said tubular space in at least a portion of said heat and mass exchange tubes is restricted.

* * * * *